Dec. 22, 1970  M. J. MORIARTY  3,549,286
ROTARY ENGINE
Filed June 22, 1967  15 Sheets-Sheet 4
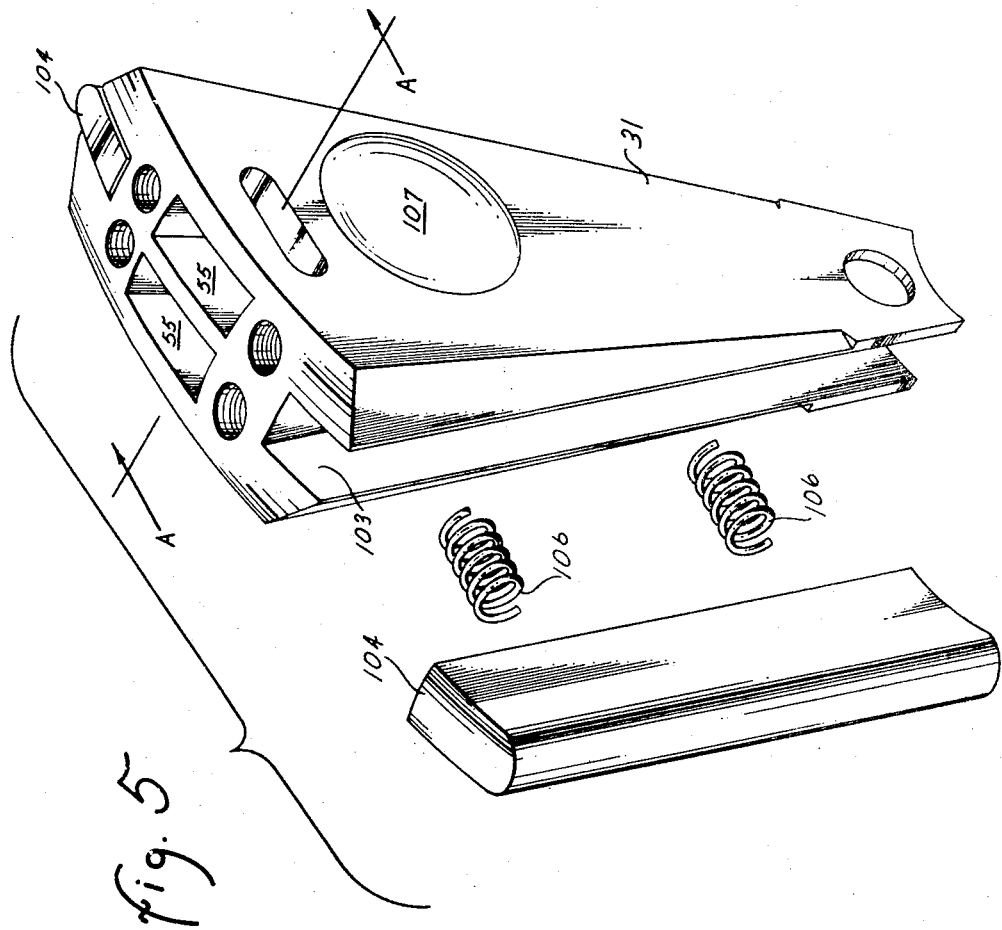
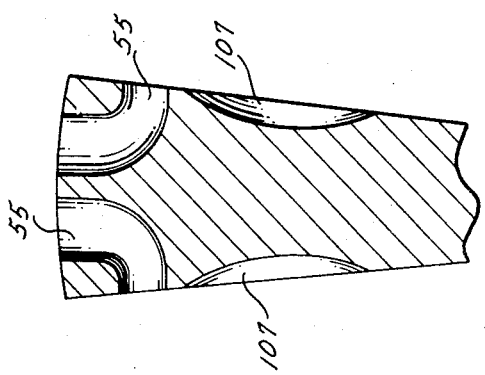
INVENTOR.
MAURICE J. MORIARTY
BY
Martin L. Stoneman
ATTORNEY Dec. 22, 1970  M. J. MORIARTY  3,549,286
ROTARY ENGINE
Filed June 22, 1967  15 Sheets-Sheet 5
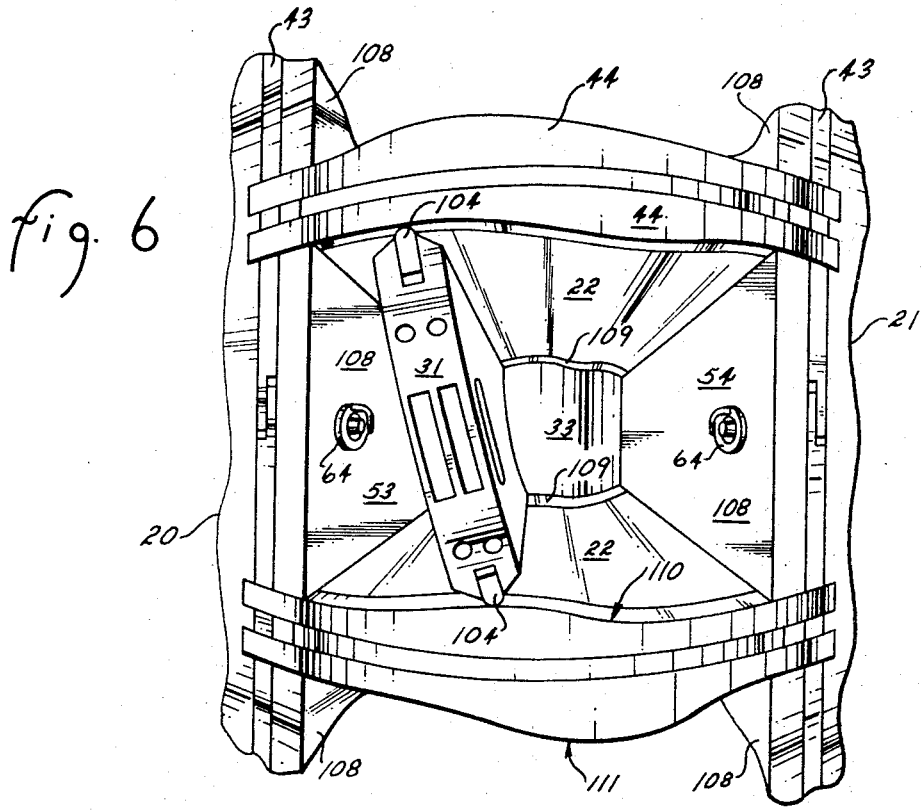
fig. 6
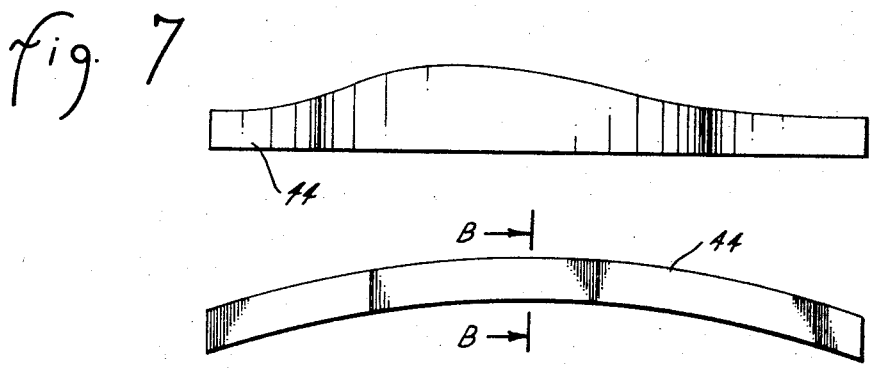
fig. 7
fig. 8
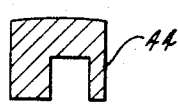
fig. 9
INVENTOR.
MAURICE J. MORIARTY
BY Martin L. Stoneman
ATTORNEY Dec. 22, 1970  M. J. MORIARTY  3,549,286
ROTARY ENGINE
Filed June 22, 1967  15 Sheets-Sheet 6
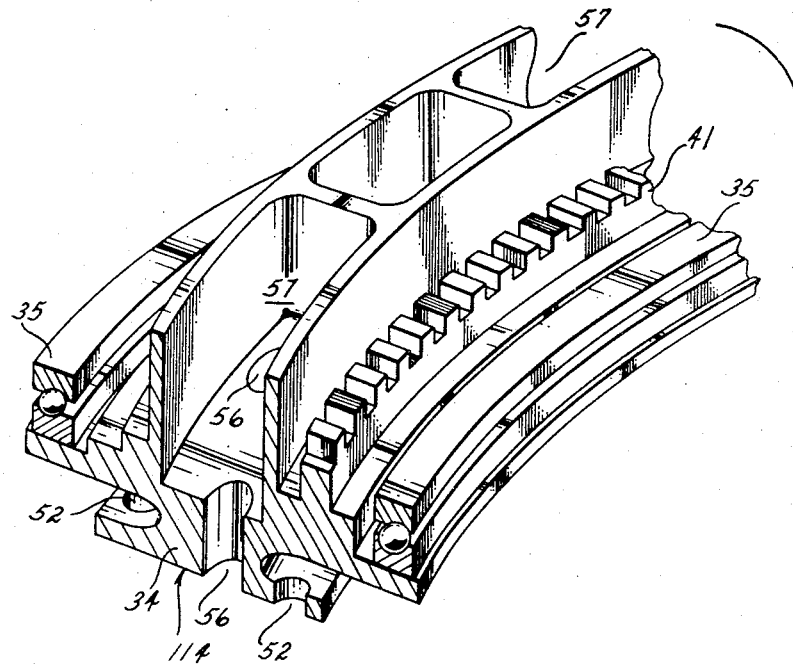
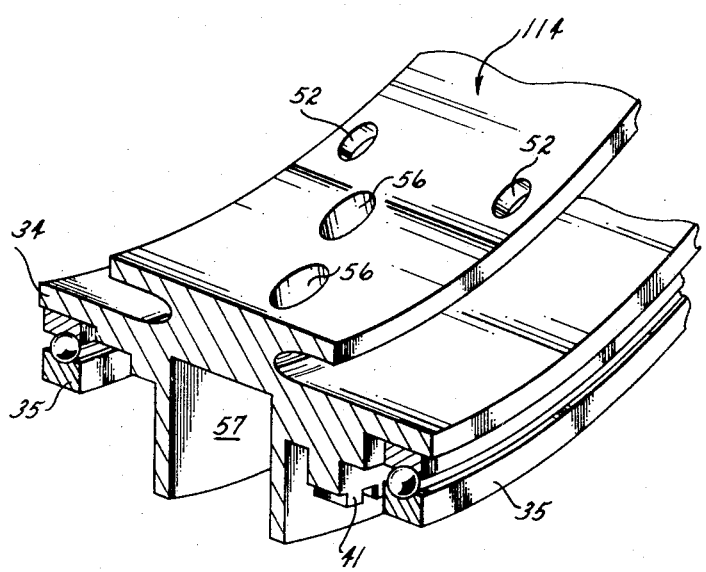
Fig. 10
INVENTOR.
MAURICE J. MORIARTY
BY
Martin L. Stoneman
ATTORNEY Dec. 22, 1970 M. J. MORIARTY 3,549,286
ROTARY ENGINE
Filed June 22, 1967 15 Sheets-Sheet 9
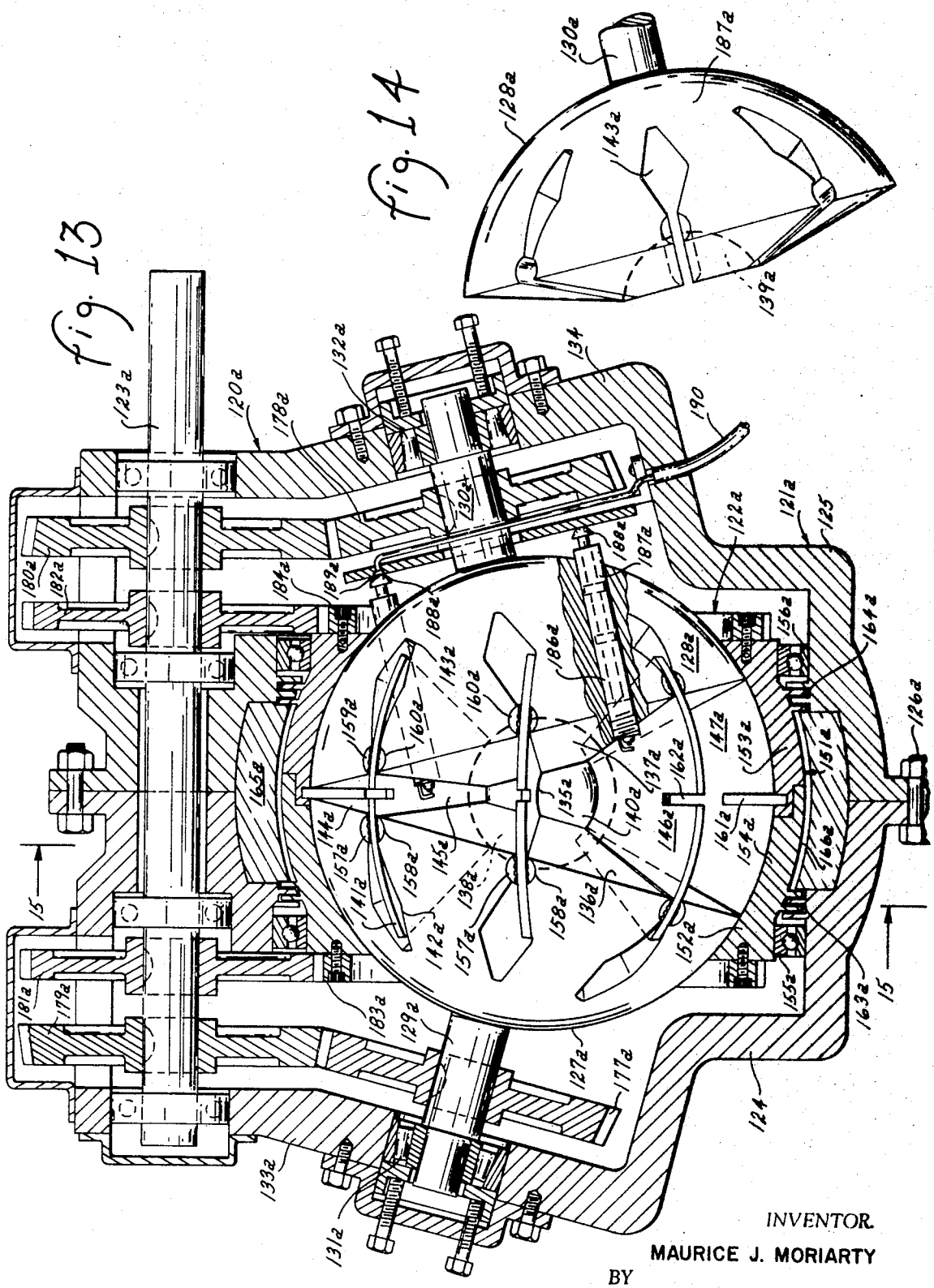
INVENTOR.
MAURICE J. MORIARTY
BY
Martin L. Stoneman
ATTORNEY

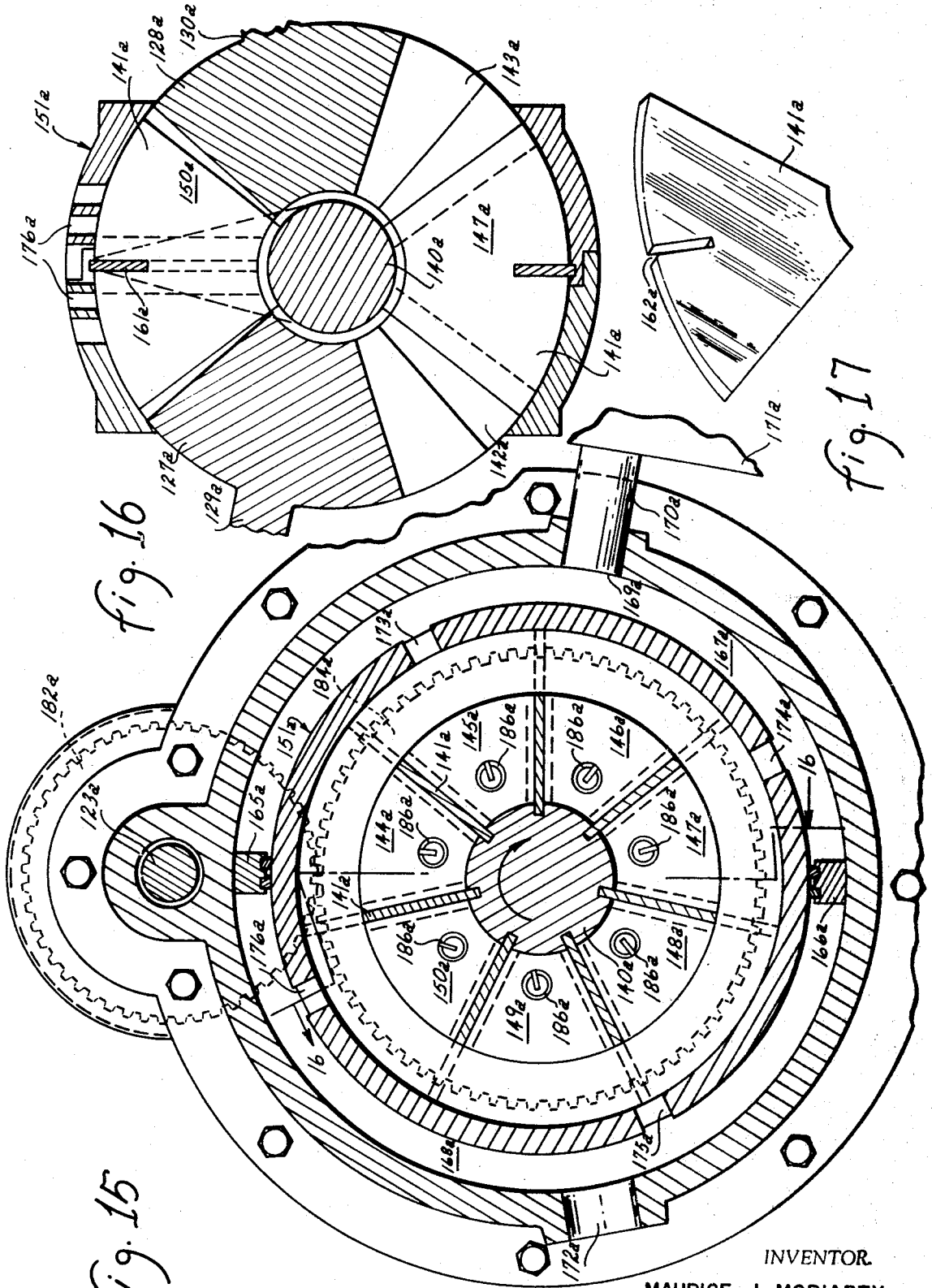

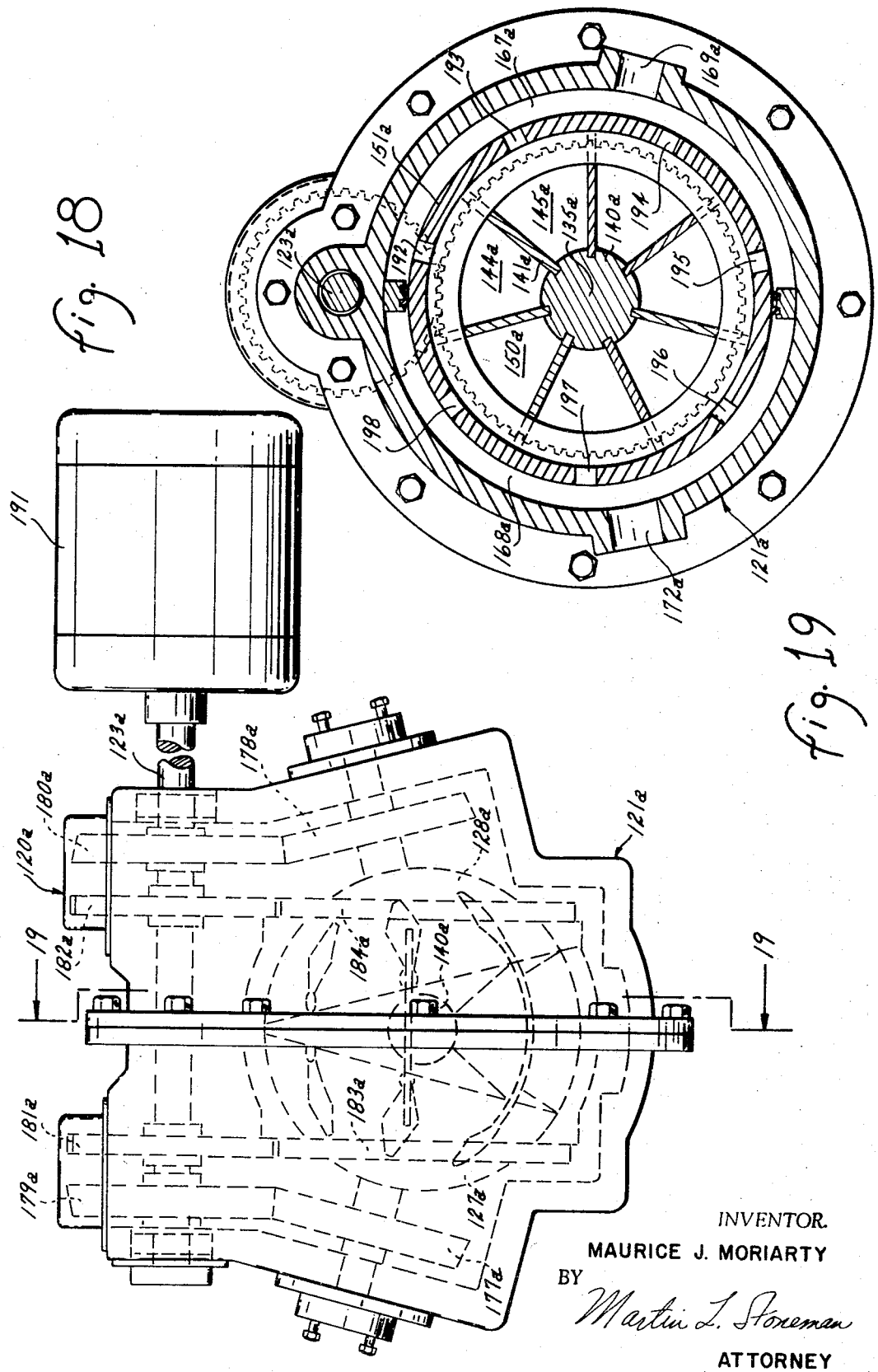

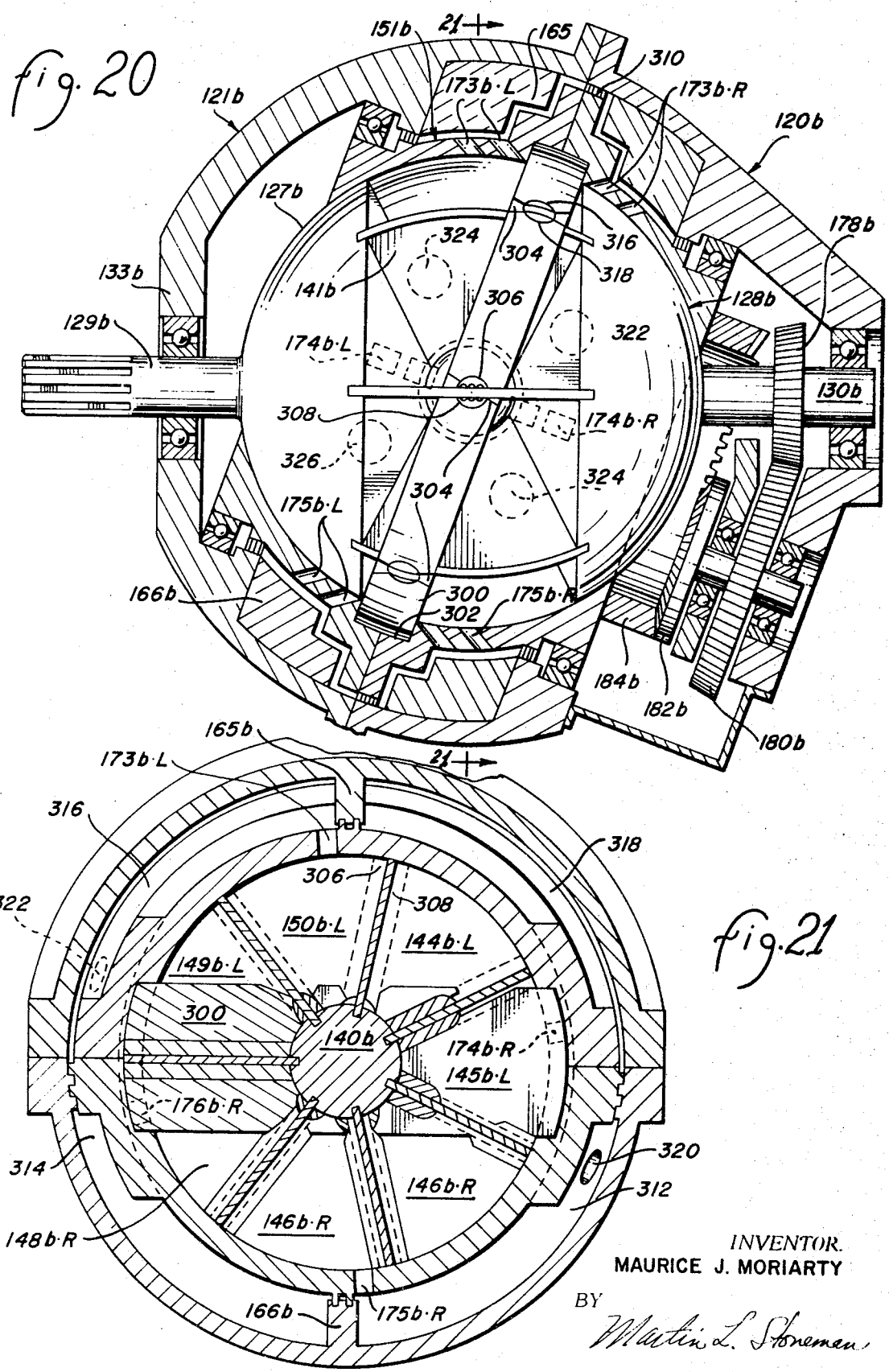

Dec. 22, 1970         M. J. MORIARTY              3,549,286
                       ROTARY ENGINE
Filed June 22, 1967                           15 Sheets-Sheet 13
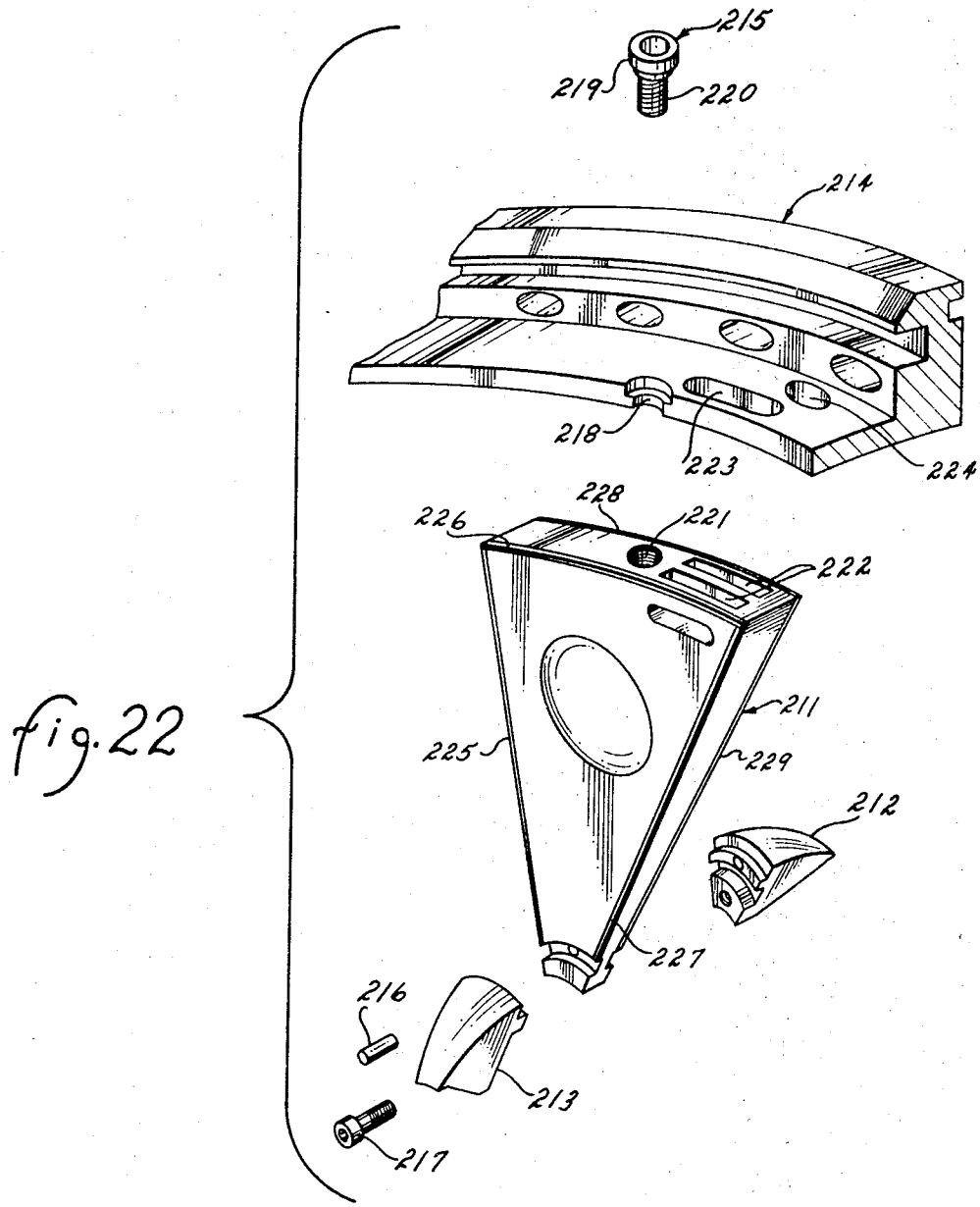
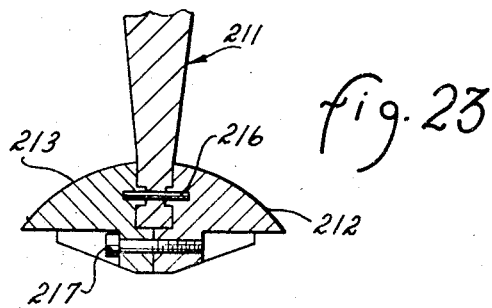
INVENTOR.
MAURICE J. MORIARTY
BY
*Martin L. Stoneman*
ATTORNEY Dec. 22, 1970  M. J. MORIARTY  3,549,286
ROTARY ENGINE Filed June 22, 1967  15 Sheets-Sheet 14

INVENTOR.
MAURICE J. MORIARTY
BY
Martin L. Storeman
ATTORNEY

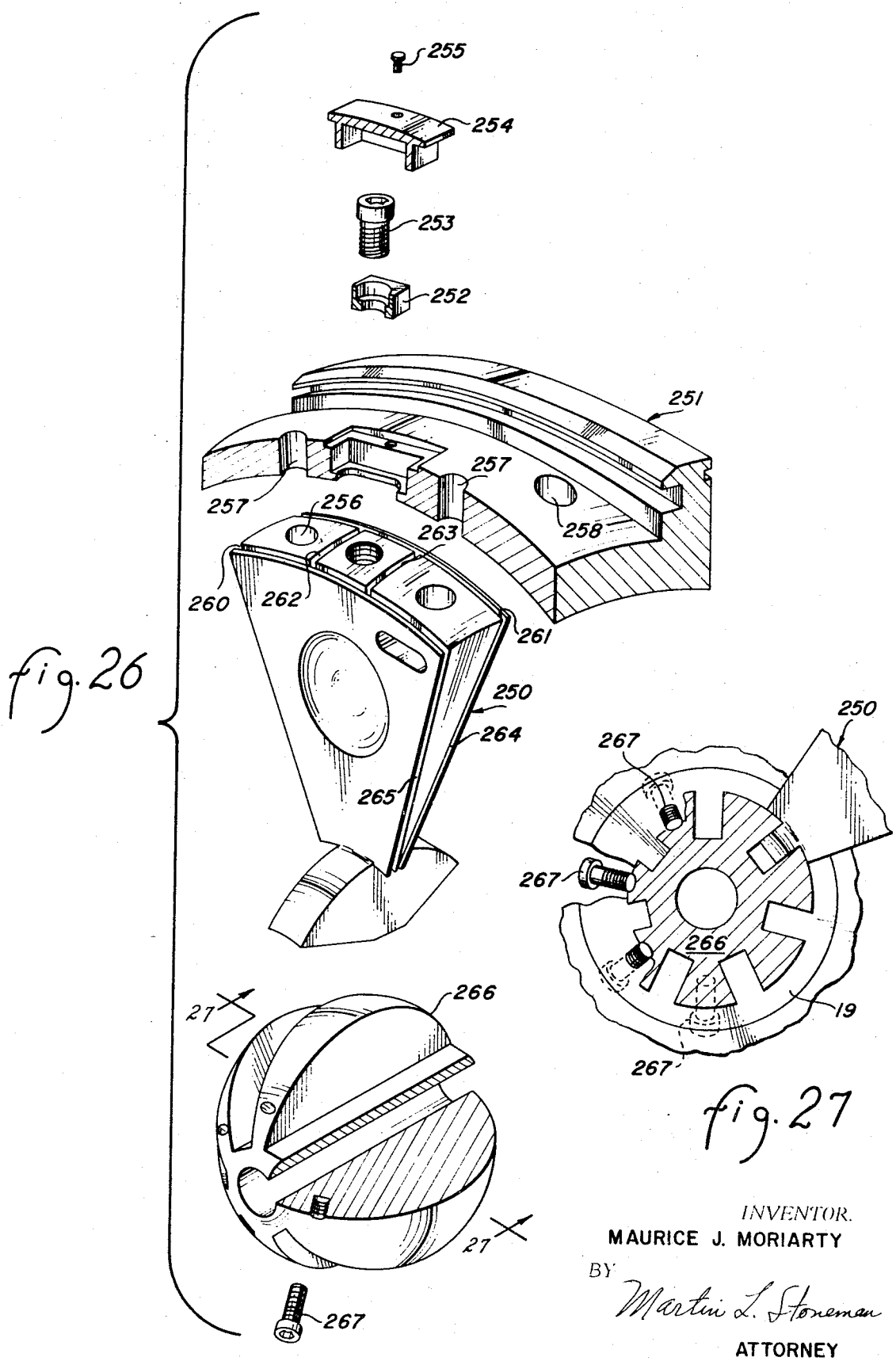

United States Patent Office
3,549,286
Patented Dec. 22, 1970

3,549,286
ROTARY ENGINE
Maurice J. Moriarty, 3225 W. Sahuaro Drive,
Phoenix, Ariz. 85029
Continuation-in-part of application Ser. No. 381,866,
July 10, 1964. This application June 22, 1967, Ser.
No. 648,058
Int. Cl. F02b 53/00; F04c 3/00
U.S. Cl. 418—85                                       23 Claims

ABSTRACT OF THE DISCLOSURE

A rotary engine of the general type having a spherical casing, a set of rotating combustion chambers, and rotating piston elements having a plane of rotation at an angle to the plane of rotation of the combustion chamber elements. A rotating annular valve ring is provided circumferentially of the combustion chambers and rotates in the same direction but at a different speed from the combustion chambers to provide porting of intake and exhaust gases.

---

This application is a continuation-in-part of my prior application, Ser. No. 381,866 filed July 10, 1964 on "Rotary Engine" and now abandoned.

BACKGROUND OF THE INVENTION

This invention relates to rotary engines.

More particularly, the invention concerns rotary engines (including pumps and compressors of similar structure) of the type known as spherical rotary engines.

Even more particularly, the invention concerns a rotary engine of the general type having a spherical casing, a set of rotating combustion chamber elements, and rotating piston elements situated within the combustion chamber elements, the piston elements being arranged to rotate in a plane at an angle to the plane of rotation of the combustion chamber elements.

In a further aspect, the invention concerns a rotary engine of the above type in which rotatable porting means are provided adjacent the said rotating chambers.

In a still further aspect, the invention concerns a rotary engine of the above type in which porting is accomplished by providing a predetermined difference between the rotational speed of the porting means and the rotational speed of the chamber elements.

Yet in a still further aspect, the invention concerns a rotary engine of the above type which has relative ease of manufacture and is particularly lightweight, compact, and efficient in operation.

The present invention further relates to a novel positive displacement unit adaptable for use as an engine, fluid pump or fluid motor, and more specifically to a novel rotary internal combustion engine or rotary fluid motor or pump.

Historically, there have been generally recognized certain advantages of rotary internal combustion engines over reciprocating internal combustion engines. Among the most important of these generally recognized advantages are (1) a higher mechanical efficiency due to rotation of the power assembly rather than reciprocation of the power assembly, (2) more compact power production possibilities with corresponding smaller sizes and lower weights, (3) smoother operation due to minimized balancing problems, (4) the compactness possibilities and the greater theoretical valving ease result in the possibility of fewer parts, (5) more direct transmission of power to the power outlet shaft is possible, (6) higher mechanical efficiency is possible due to longer lever arms at the point of application of forces to the power outlet shaft. Also, historically, rotary engines have appeared to have certain disadvantages. The most obvious of these have been (1) the apparent inescapability of high rubbing velocities of high pressure seals and (2) the apparent need for machining of unusually shaped surfaces and/or unusual seal motions, configurations, and materials, often requiring line-point-of-contact seals.

Additionally, in neither past internal combustion engines of the rotary type nor the reciprocating type has supercharging of intake gases been accomplished as a by-product of engine operation. Nor has vacuum scavenging of the exhaust gases been accomplished as a by-product of the engine operation.

It would be highly advantageous therefore to provide a rotary engine having all of the generally recognized advantages of rotary engines over reciprocating engines and having none of the generally recognized disadvantages of past rotary engines. It would be additionally advantageous to provide in such a rotary engine such factors as supercharging of intake gases, vacuum scavenging of exhaust gases, water cooling of rotating parts, and a lightweight, practical, compact, and easy to manufacture design.

SUMMARY OF THE INVENTION

Accordingly, it is a principal object of the present invention to provide a novel unit adaptable for use as a rotary engine, a fluid motor or pump which can be economically manufactured and is simple in operation and relatively efficient. A further important object of the present invention is to provide a novel unit adaptable for use as a rotary engine, motor pump or the like which is constructed so as to minimize wear.

Still another object of the present invention is to provide a novel unit of the above-described type which has a rugged compact construction.

A further important object of the present invention is to provide a novel unit of the above described type having inlet and outlet ports constructed and arranged for controlling the flow of fluid into and out of the unit without requiring separate movable valve members.

A further important object and feature of the present invention is to provide a novel unit of the above described type which eliminates the prior problems of the art connected with high pressure seals which must maintain their efficiency at a high sliding velocity. An important object of the present invention is to provide such a novel unit wherein an engine or pump may be operated at high speed while minimizing the sliding velocity of high pressure seals.

A further object of the present invention is to provide a novel unit adaptable for use as a rotary piston engine, fluid motor, pump, or the like, which is constructed without reciprocating parts so as to minimize or eliminate counter balancing and related problems heretofore presented by such reciprocating parts.

Yet another object of the present invention is to provide a novel rotary engine which may be adapted for use with either spark ignition systems or compression ignition systems.

Still another object of the present invention is to provide a novel rotary internal combustion engine constructed for facilitating air intake and exhaust in such manner as to promote improved thermal efficiency.

A further important object and feature of the present invention is to provide a novel engine having one or more series of expandable compartments movable around an endless path of travel and constructed for expending in a manner causing bodily movement of the compartments in a predetermined direction.

Still another object and feature of the present invention is to provide a novel unit of the above-described type having a relationship between the parts thereof which provides better heat transfer characteristics and eliminates the need for many bearings.

Yet another object and feature of the present invention is to provide a novel unit of the above-described type in which certain of the parts are contoured or profiled to eliminate the need for oscillatory seals.

Still another object of the present invention is to provide a novel unit of the above-described type which includes an improved cooling system.

A further important object of the present invention is to provide a novel unit of the above-described type having simplified intake and exhaust and providing for the use of many common parts.

Yet another object of the present invention is to provide a novel unit of the above-described type providing for improved pumping and prepressurizing of intake charges and more advantageous heat transfer characteristics in connection with the intake charges.

Yet another object of the present invention is to provide a novel unit of the above-described type having an improved lubrication system.

It is another important object and feature of this invention to provide in a rotary engine of the above-described type a valving system eliminating mechanical valving and providing for unobstructed flow of intake and exhaust gases.

Yet another object and feature of the present invention is to provide a novel unit of the above-described type providing vacuum scavenging of exhaust gases to provide more efficient operation.

Yet another object of the present invention is to provide in connection with vacuum scavenging a positive pressure exhaust system adaptable for use with auxiliary equipment such as exhaust filters without effects which are detrimental to engine operation.

Yet another object of the present invention is to provide in a rotary engine a more direct power drive of the output shaft.

Yet another object of the present invention is to provide a novel unit of the above-described type providing the elimination of not only oscillatory seals but also the elimination of difficult-to-obtain contoured or profiled parts which might otherwise be required to compensate for the complex relative motion between the combustion chamber elements and the piston elements.

These and other further and more specific objects, advantages, and features of the present invention will become readily apparent to those skilled in the art from the detailed description of the presently preferred embodiment thereof.

The desired objectives of the present invention, according to a presently preferred embodiment, are provided by providing a unit including rotor means providing an endless series of rotatable compartments, each said compartment being adapted to change in volume cyclically from a minimum volume to a maximum volume to a minimum volume with rotation of said compartments. Rotatable porting means are also provided adjacent the rotor means and adapted to cyclically port each of the compartments. Further, timing means are provided and constructed and arranged to provide a predetermined difference between the rotational speed of the rotor means and the rotational speed of the porting means. The above elements are preferably provided by providing a rotary engine of the general type having a spherical casing, a set of rotating combustion chambers in the casing, and rotating piston elements within the combustion chambers, the piston elements having a plane of rotation at an angle to the plane of rotation of the combustion chamber elements. High speed seals in areas of high pressure and high temperature are avoided by providing a rotating annular valve ring circumferentially of the combustion chambers. The valve ring rotates in the same direction but at a different speed from the combustion chambers to provide porting of intake and exhaust gases. This relative speed may be maintained within low ranges, although the overall speed of rotation of the engine may be relatively high.

The piston elements of the rotary engine of the present invention are tied to the shaft in a new and novel way, enabling the provision of a more direct drive between the pistons and the shaft than was heretofore possible. Additionally, although the general engine configuration of the rotary engine of the present invention is that ordinarily known as a spherical engine with a disc-type pressure plate, the disc segments or piston elements, which rotate in a different plane than the plane of rotation of the combustion chambers are, according to the present invention, each segment thereof, movable separately in a combustion chamber with a simple type of reciprocating relative motion rather than the complex relative motion normally found in this type of engine. The apparently "inherent" unusual relative motion patterns between the combustion chamber elements and the piston elements are eliminated by driving the piston elements by means of a simple connection which compensates for the relative motion differences.

Intake gases into the combustion chambers enter the combustion chambers by the way of a spherical shell which completely encloses the combustion chambers and rotates with the combustion chambers; thus the intake gases are centrifugally pumped to provide prepressurizing of the intake charges. Additionally, according to the preferred embodiment of the present invention, exhaust gases are ported from the combustion chambers by way of the annular valve ring, which is rotating and which is provided with vanes so as to pump the exhaust gases to provide vacuum scavenging and a positive exhaust pressure. Furthermore, a novel cooling system is provided which enables water cooling of rotating parts by making use of the power shaft as a water carrier.

BRIEF DESCRIPTION OF THE DRAWINGS

A more thorough understanding of the present invention will become readily apparent to those skilled in the art from the following detailed description of presently preferred embodiments thereof taken in conjunction with the drawings in which:

FIG. 4 is an exploded perspective view of a pressure plate segment of the illustrated invention and its allied seals;

FIG. 5 is a partial sectional view taken generally along the section 5—5 of FIG. 4;

FIG. 6 is a partial elevational view taken generally of the interior of one of the compartments of the embodiment of this invention illustrated in FIG. 1;

FIG. 7 is a plan view of the blade seal of the embodiment of the present invention illustrated in FIG. 1;

FIG. 8 is an elevational view of the blade seal of FIG. 7;

FIG. 9 is a sectional view of the blade seal of FIG. 8 taken through the section 9—9 of FIG. 8;

FIG. 10 is a fragmentary view, partially in section, in perspective, of the annular valve ring of the embodiment of the present invention illustrated in FIG. 1;

FIG. 13 is a partial sectional view showing another preferred embodiment of a rotary internal combustion engine incorporating the features of the present invention;

FIG. 14 is a fragmentary elevational view showing a rotor member incorporated in the engine of FIG. 13;

FIG. 15 is a sectional view taken generally along line 15—15 in FIG. 13;

FIG. 16 is a fragmentary sectional view taken generally along line 16—16 in FIG. 15;

FIG. 17 is a perspective view showing a blade or vane element incorporated into the construction of the embodiment of FIG. 13;

FIG. 18 is an elevational view showing a unit incorporating features of the present invention adapted to be used as a fluid pump or motor;

FIG. 19 is a sectional view taken generally along line 19—19 in FIG. 18;

FIG. 20 is a partial sectional view showing another modified form of the present invention;

FIG. 21 is a sectional view taken generally along the line 21—21 in FIG. 20;

FIG. 22 is an exploded perspective view of the portion of the embodiment of FIG. 1 illustrated by FIG. 2, except showing an improved and preferred structure;

FIG. 23 is a sectional view of the assembled center ball segments of FIG. 22;

FIG. 26 is an exploded perspective view of yet another and more preferred embodiment of the invention as basically illustrated by the embodiment of FIG. 1 and further improved by the embodiments of FIGS. 22–25, showing the improved manner of construction and connection between the outer shell, the combined pressure plate and ball segments, and the one-piece inner ball structure;

FIG. 27 is a cut-away view of the center ball of FIG. 26, partially in section, illustrating the manner in which the various parts are there connected.

DESCRIPTION OF THE PREFERRED EMBODIMENTS

Figure 1:
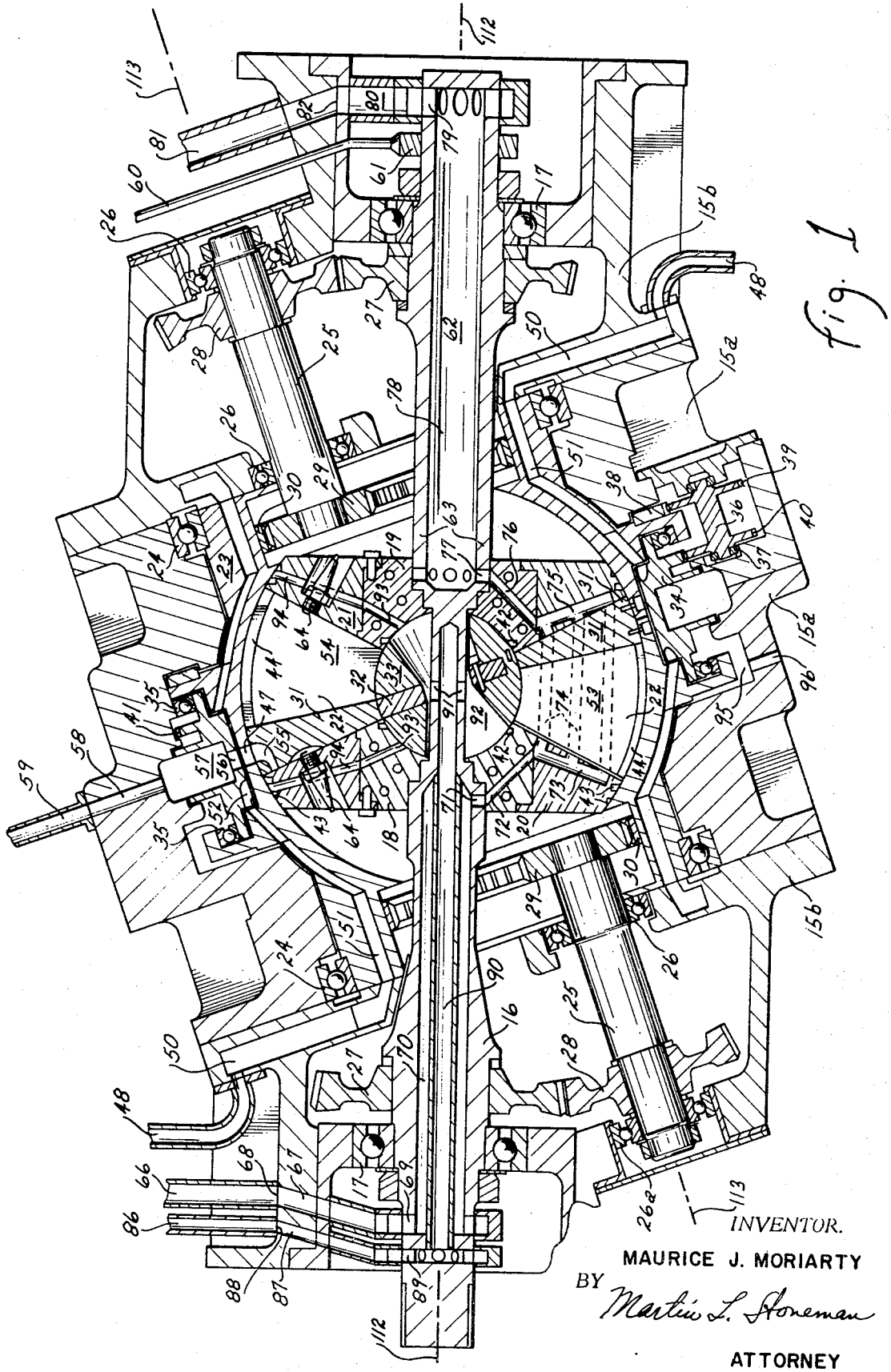
FIG. 1 is a partial sectional view showing a preferred embodiment of the rotary internal combustion engine of the present invention.

The preferred embodiment of the engine, as illustrated, is comprised generally of a housing 15. Housing 15 consists of four housing sections. The two center housing sections are shown as 15a and the two end housing sections are shown as 15b. Shaft 16 is rotatably mounted in housings 15b with bearings 17. Split rotor hubs 18 and 19 are fixed to shaft 16. Rotors 20 and 21 are fixed to split hubs 18 and 19 respectively. Blades 22 are attached to rotors 20 and 21. In the engine as illustrated there are seven blades 22. Rotatable shell 23 is rotatably mounted in housing sections 15a and bearings 24. Jack shafts 25 are rotatably mounted in housing sections 15b in bearings 26. Bevel gears 27 are fixed on shaft 16 and drive bevel gears 28 which are fixed to jack shafts 25. Gears 29 are attached to jack shafts 25 and drive gears 30 which are attached to rotatable shell 23. Gears 27, 28, 29 and 30 are so selected so that rotatable shell 23 and shaft 16 turn in the same direction and at the same speed.

Pressure plate segments 31 are attached on their outer periphery to rotatable shell 23 and on their inner periphery to pressure plate hub 32. As shown, there are seven pressure plate segments 31 and one pressure plate hub 32. Split center ball halves 33 are attached to pressure plate hub 32. Rotatable shell 23, pressure plate segments 31, pressure plate hub 32 and split center ball halves 33 are preferably attached to one another by means of bolts so that the entire section rotates as an assembly.

Valve ring 34 is rotatably mounted on shell 23 by means of bearings 35. Jack shaft 36 is mounted in housing sections 15a by means of bearings 37. Gear 38 is fixed to shell 23 and driven by means of gear 39, attached to jack shaft 36. Drive gear 41 is attached to valve ring 34 and is driven by gear 40, gear 40 also being attached to jack shaft 36. Selection of gear ratios involved in gears 38, 39, 40 and 41 determines a timed relationship between shell 23 and valve ring 34 which will be discussed hereinafter.

Figure 2:
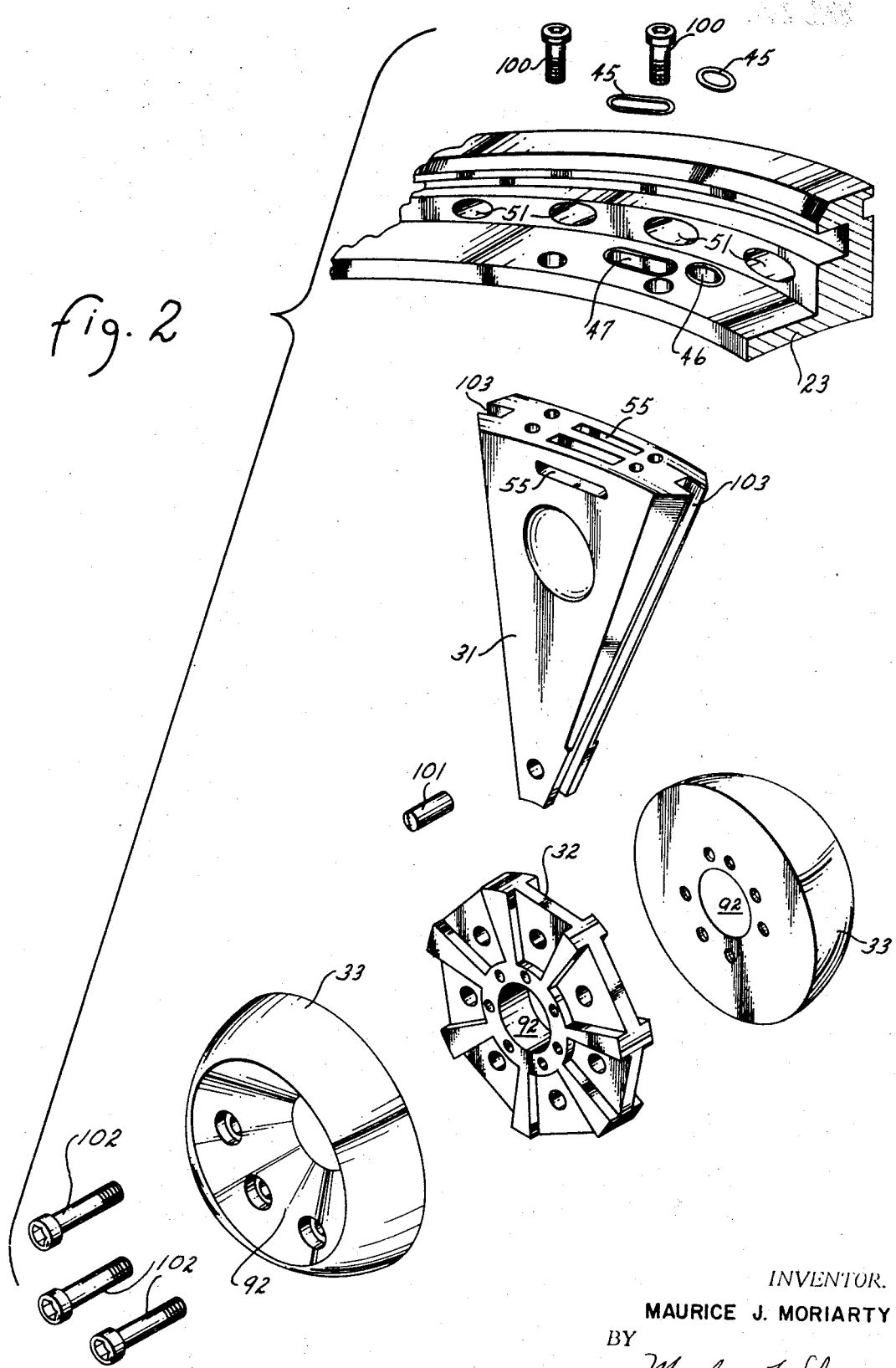
FIG. 2 is an exploded perspective view showing the split center ball, pressure plate hub, pressure plate segment, outer rotating shell, and allied parts as incorporated in the engine of FIG. 1.

Split rotor hubs 18 and 19 contain seals 42 which engage center ball halves 33 in close running contact. Rotors 20 and 21 contain seals 43 which are in close running contact with shell 23. Blades 22 contain seals 44 which are in close running contact with shell 23. Seal 44 is best shown in FIGS. 6, 7, 8 and 9. Seals 45, which are best shown in FIG. 2, are so mounted in shell 23 as to effect a seal between intake ports 46 and exhaust ports 47 in shell 23 and valve ring 34. Seals 45 slide on valve ring seal surface 114.

Intake manifold 48 is connected on its one extremity with carburetion system 49 (shown best in FIG. 11) and at its other end to housing sections 15b. Intake passageway 50 communicates at one end with intake manifold 48 and at its other end with intake passageway 51 in shell 23. Intake passageways 51 in shell 23 communicate with intake ports 52 in valve ring 34. As best shown in FIG. 10, there are eight intake passageways 52 in valve ring 34, four servicing left side combustion chambers 53, and four servicing right side combustion chambers 54.

Combustion chambers 53, of which there are seven, are shown to the left of pressure plate segments 31, and combustion chambers 54 of which there are seven are shown to the right of pressure plate segments 31 in FIG. 1. It should be noted that the seal surface 114 on valve ring 34 does not contact or slide on shell 23 but is separated from it by means of bearings 35. Necessary sealing at this location is accomplished by means of seals 45 mounted in shell 23 and sliding on seal surface 114. Exhaust passageways 55 in pressure plate segments 31, best shown in FIGS. 4 and 5, communicate with combustion chambers 53 and combustion chambers 54 on their one extremity and on their other extremity communicate with exhaust passageways 47 in shell 23. Exhaust ports 56, of which there are eight, in valve ring 34, best shown in FIG. 10, communicate with exhaust passageways 47 in shell 23 at a predetermined time hereinafter discussed. As shown in FIG. 1, of the aforementioned eight exhaust ports 56 in valve ring 34, four are for servicing left side combustion chambers 53 and four are for servicing right side combustion chambers 54. Exhaust collector manifold 57 is connected to exhaust passageway 58 and then to exhaust system 59.

It is to be understood that, between intake passageways 50 in housing sections 15b and intake passageways 51 in shell 23, suitable low pressure seals should be provided to isolate intake mixtures from lubricating oils. The same provisions would of course be made between intake passageway 51 in shell 23 and intake passageway 52 in valve ring 34 and also between exhaust collector manifold 57 and housing sections 15a. Briefly, suitable ignition system 60 carries necessary spark impulses by means of a slip ring on shaft 16 at 61, thence through the hollow portion of shaft 16 at 62, then through shaft 16 at 63 to suitable spark plugs 64.

Figure 11:
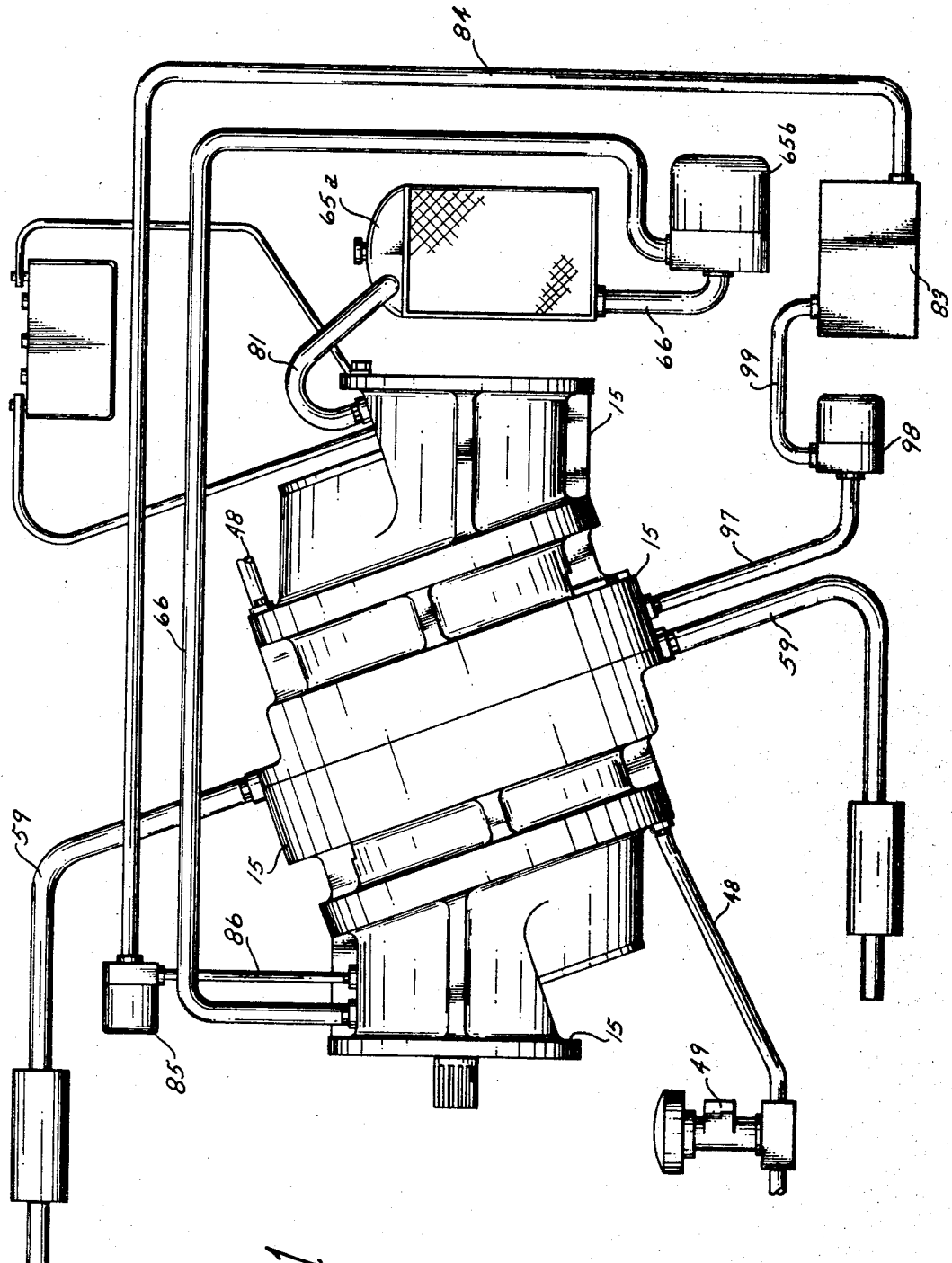
FIG. 11 is a plan view of a schematic nature, illustrating the several systems of the embodiment of the present invention illustrated in FIG. 1.

Coolant system 65, as best shown in FIG. 11, supplies coolant through supply line 66 to passageway 67 in housing sections 15b at 68. Coolant passageway 67 communicates with rotary valve 69 in shaft 16 in such a way that coolant fluids are allowed to be in constant supply through passageway 70 in shaft 16. Coolant fluids flow from passageway 70 through passageways 71 in shaft 16 into passageways 72 in split rotor hub 18 through passageways 72 in split rotor hub 18 to passageways 73 in rotor 20 through passageways 74 in blades 22 to passageways 75 in rotor 21 through passageways 76 in split rotor hub 19 to passageways 77 in shaft 16 through passageway 78 in shaft 16 through rotary valves 79 in shaft 16 through passageway 80 in housing section 15*b* (right) to coolant return line 81 at 82 in said housing section 15*b*.

Lubricant reservoir 83, as shown in FIG. 11, supplies lubricant to the engine by means of lubricant supply line 84, lubricant pump 85, and lubricant supply line 86. Lubricant supply line 86 connects with lubricant passageway 87 in housing section 15*b* at 88 and the lubricant passageway continues thence to rotary valve 89 in shaft 16 and thence through lubricant passageway 90 in shaft 16 and thence through lubricant passageway 91 to lubricant reservoir 92, which comprises the hollow center section of split center balls 33 and pressure plate hub 32. Lubricant is thence distributed to the obvious and necessary seal and lubricant points by means of passageways 93 in split rotor hubs 18 and 19 and passageways 94 in rotors 20 and 21. It would also be obvious that lubricants can be suitably channeled from passageway 87 through housing sections 15*b* and 15*a* to other necessary points of lubrication throughout the engine. Lubricants are by means of auxiliary pump 85, supplied to lubricant reservoir 92 and thence are centrifugally forced through various rotating parts of the engine, as described in the operation of the engine hereinafter, and are allowed to drain off to a low point in the housing section 15*a* at approximate location 95 where by means of passageway 96, which is connected to oil return line 97 and sump pump 98, oil or lubricants are returned by means of lubricant return line 99 to reservoir 83.

It would be obvious that suitable auxiliary drives, ignition systems, starting systems and the like can be suitably provided. It would also be obvious that power may be taken from either end of shaft 16.

More particularly shown in FIG. 2 is an exploded view of the split center balls, pressure plate center section, pressure plate segments 31, rotatable shell 23, and allied parts. It should be noted that, although FIG. 2 shows one pressure plate segment 31, as previously stated there are seven such segments suitably arranged around pressure plate center section 32. It should also be noted that exhaust passageway 47 in shell 23 and intake port 46 in shell 23 and seals 45, as shown, serve to properly service only one combustion chamber, of which there are fourteen. Thus the total number of intake ports 46 is fourteen and the total number of exhaust ports 47 is fourteen. It should also be noted that intake passageways 51 are most clearly shown in FIG. 2 as is oil reservoir 92. Pressure plate segment 31 is suitably bolted to shell 23 by means of bolts 100 as shown. Pressure plate segment 31 is attached to pressure plate hub 32 by means of pins 101 as shown and center ball halves 33 are suitably attached to pressure plate hub 32 by means of bolts 102 as shown. Slots 103, as shown, on pressure plate segment 31 contain seals 104, which are best shown in FIG. 4.

Figure 3:
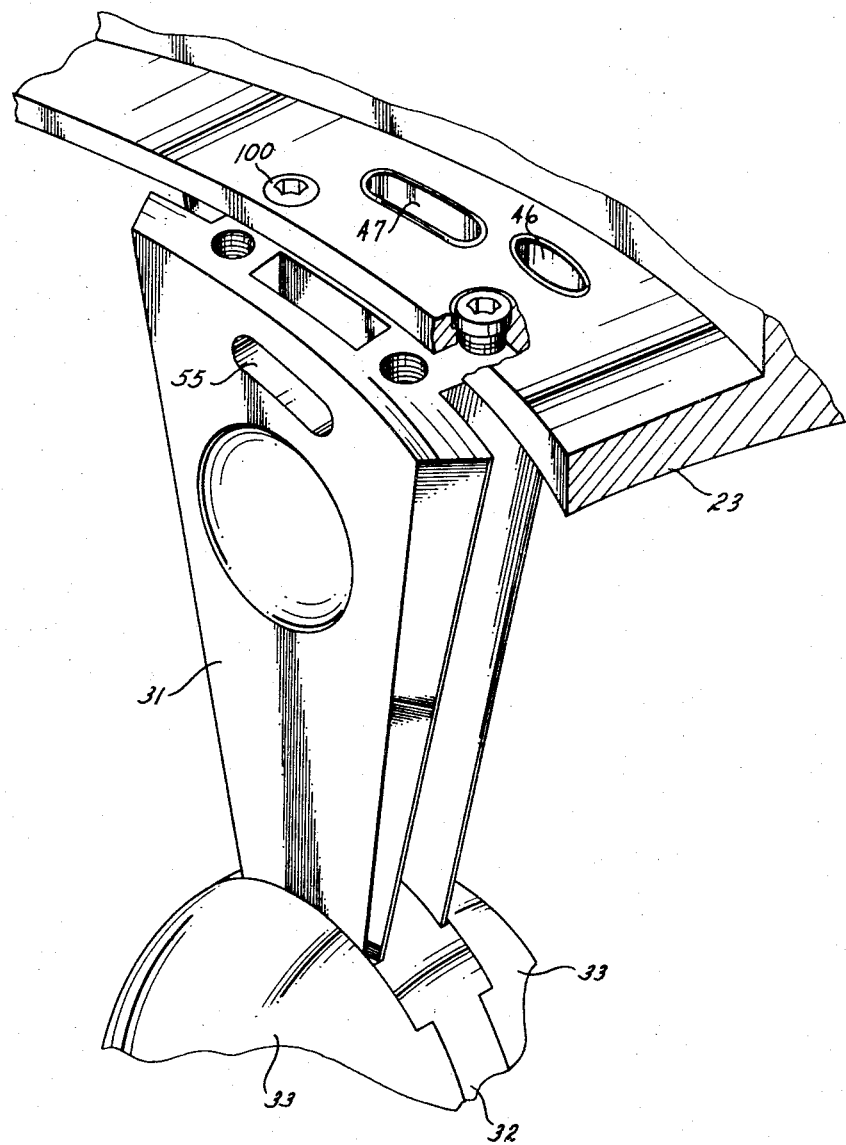
FIG. 3 is a perspective view, partially in section, generally illustrating the manner in which the parts shown in FIG. 2 are assembled.

With more particular reference to FIG. 3 there is shown the assembled position of the various parts in FIG. 2 assembled in their correct location.

More particularly shown in FIGS. 4 and 5 is pressure plate segment 31, clearly showing the seals 104 and the springs 106 which keep seals 104 in close contact with blades 22. FIG. 4 is a section (section A—A) through pressure plate segment 31 as shown in FIG. 5, which section more clearly shows exhaust passageways 55 and combustion chamber wells 107. Combustion chamber wells 107 are provided for the purpose of aiding combustion chamber efficiency.

More particularly shown in FIG. 6 is a plan view of one of the left side combustion chambers 53 and one of the right side combustion chambers 54 which more clearly shows the assembled position of the various parts thereof. Also shown in this view are the wedge-shaped walls 108 of rotors 20 and 21. Seals 43, 44, 104 and 109 are also clearly shown. Seals 44, which are in close contact with shell 23, and seals 109, which are in close contact with center ball halves 33 and pressure plate hub 32, are of similar construction and are similarly mounted on blades 22 and are spring loaded so as to contact the aforementioned parts.

Seals 44 and 109 as well as blade 22 are contoured in such a way as to maintain intimate contact with seal 104 on pressure plate segment 31 throughout a complete revolution of the engine assembly without excessive movement of seal 104. The contoured shape of blades 22, seals 104, and seals 109, as shown, is an approximate generation of the surface necessary to eliminate oscillatory motion of seal 104. Prior art has offered many suggested contours and shapes for blades similar to 22 as well as many sliding or shutter type seals similar to seals 104. However, it is believed that the oscillatory action of seals 104 must be as nearly as possible eliminated to achieve proper sealing and operation of this type of engine. It is further believed that in order to eliminate as nearly as possible the oscillatory action of seal 104 it is necessary to generate a proper profile as shown on blades 22, seals 44, and seals 109. It is pointed out that the shapes of blade surfaces 110 and 111 are not complementary at any given section and that this uncomplementary generated shape is necessary to achieve the aforementioned purpose.

FIGS. 7, 8 and 9 more clearly show seal 44. Although similar figures are not shown for seal 109, as previously stated, seal 109 is similar in construction to seal 44; thus, from these teachings, the method of design and construction of seal 109 will be obvious to those skilled in the art.

FIG. 10 is a partial perspective view and cutaway of valve ring 34 which more clearly shows the construction of said valve ring 34 and its relationship with allied parts. Bearings 35, as previously mentioned, are mounted within housing sections 15*a* and support valve ring 34 so that it is rotatable. Gear 41, as previously mentioned, is suitably engaged to gears 40, 39 and 38 so that valve ring 34 rotates in a predetermined timed relationship with shell 23. Gear 41 is suitably attached to valve ring 34 by means of bolts, not shown. Also shown in FIG. 10 are the intake ports 52 and the exhaust ports 56. Also shown is a portion of exhaust collector ring area 57.

The preferred embodiment of the present invention illustrated in FIGS. 1–11 operates on the four cycle principle and to further describe its operation an explanation of the workings of its combustion chambers and a description of one complete cycle of one combustion chamber follows:

Preliminarily, it is helpful to visualize that within shell 23 and center ball halves 33, rotors 20 and 21, split rotor hubs 18 and 19, and blades 22 there are formed seven similarly shaped compartments, which are spherical on their inner and outer surfaces and with slanting wedge-shaped side walls. Pressure plate segments 31, which are attached to pressure plate hub 32, center ball halves 33, and shell 23, are so mounted as to bisect the aforementioned compartments at an oblique angle. Shaft 16, split rotor hubs 18 and 19, rotors 20 and 21, and blades 22 rotate as an assembly about axis 112 as shown in FIG. 1. Shell 23, pressure plate segments 31, pressure plate hub 32, and split ball halves 33 rotate as an assembly about axis 113 in such a way that the fourteen compartments formed as previously mentioned each grows continuously larger in volume during one-half of a revolution and continuously smaller in the other half of the revolution. It should be noted, as set out earlier, that the assembly which rotates on axis 112 and the assembly which rotates on axis 113 are so connected as to rotate at the same speed.

To complete one cycle of operation, any one of the fourteen combusion chambers formed as described must rotate about the shaft axis two complete revolutions or 720 degrees of rotation.

Starting the rotation of one of said chambers at the point of rotation at which the chamber is smaller, the first 180 degrees of rotation of this chamber is called the intake cycle. Intake is accomplished during this period by means of intake port 52 in valve ring 34, which, during this period of rotation, is in cooperation with intake passageway 46 in shell 23, allowing entry into the chamber of air-fuel mixture which has been brought into the engine by means of carburetion system 49 through passageways 48, 50 and 51. It should be noted that the intake gases, in traveling through passageway 51, are centrifugally pumped through shell 23 so that a more positive intake pressure is achieved at the time of communication of ports 52 and 46. It should also be noted that the passage of intake gases through passageway 51 aids in the cooling of shell 23 through heat transfer and also aids in the proper vaporization of the fuel.

During the next 180 degrees of rotation of the assemblies, valve ring 34 has been, by means of proper timed relationship between gears 38, 39, 40 and 41, rotated to a position so that intake portion 52 no longer communicates with intake port 46. At the start of the second 180 degrees of rotation of the assemblies, intake port 46 is closed and compression of the previously inducted air-fuel mixture takes place during the said second 180 degrees of rotation. At the appropriate time, as determined by good combustion procedure, some time near the end of the second 180 degrees of rotation or the start of the third 180 degrees of rotation, ignition spark is supplied and the compressed air-fuel mixture is ignited.

The third 180 degrees of rotation is called the expansion or combustion cycle. The burning and expanding gases contained in the sealed chamber cause pressures to be exerted against the side walls of split rotor hub 18 or 19, rotor 20 or 21, and the side wall of pressure plate segment 31, producing a rotating force. It is obvious, applying the laws of inclined planes, that the amount of force developed is affected by the angular displacement with respect to one another of the assemblies which rotate on the respective axes 112 and 113.

At the completion of the combustion cycle or the third 180 degrees of rotation, valve ring 34 has rotated to a point at which exhaust port 56 cooperates with exhaust port 47 and exhaust passageway 55, so that the exhaust cycle may be accomplished. During the fourth 180 degrees of rotation, the exhaust gases are allowed to pass through passageway 55 in pressure plate 31, port 47 in shell 23, and port 56 in valve ring 34 then to exhaust collector ring area 57 and thence through passageway 58 in housing section 15a to exhaust system 59. It is at the completion of the exhaust cycle that 720 degrees of rotation have been accomplished, and for a given chamber the entire cycle is then repeated.

It will be noted that the exhaust collector ring area 57 shown in FIG. 10 includes vanes which on rotation produce a pump-like action in the exhaust collector ring area to provide vacuum scavenging of the exhaust gases and a positive exhaust pressure. Also shown in FIG. 10 is seal surface 114 of valve ring 34. This seal surface 114 is the surface which mates against the seals mounted in shell 23.

Figure 12:
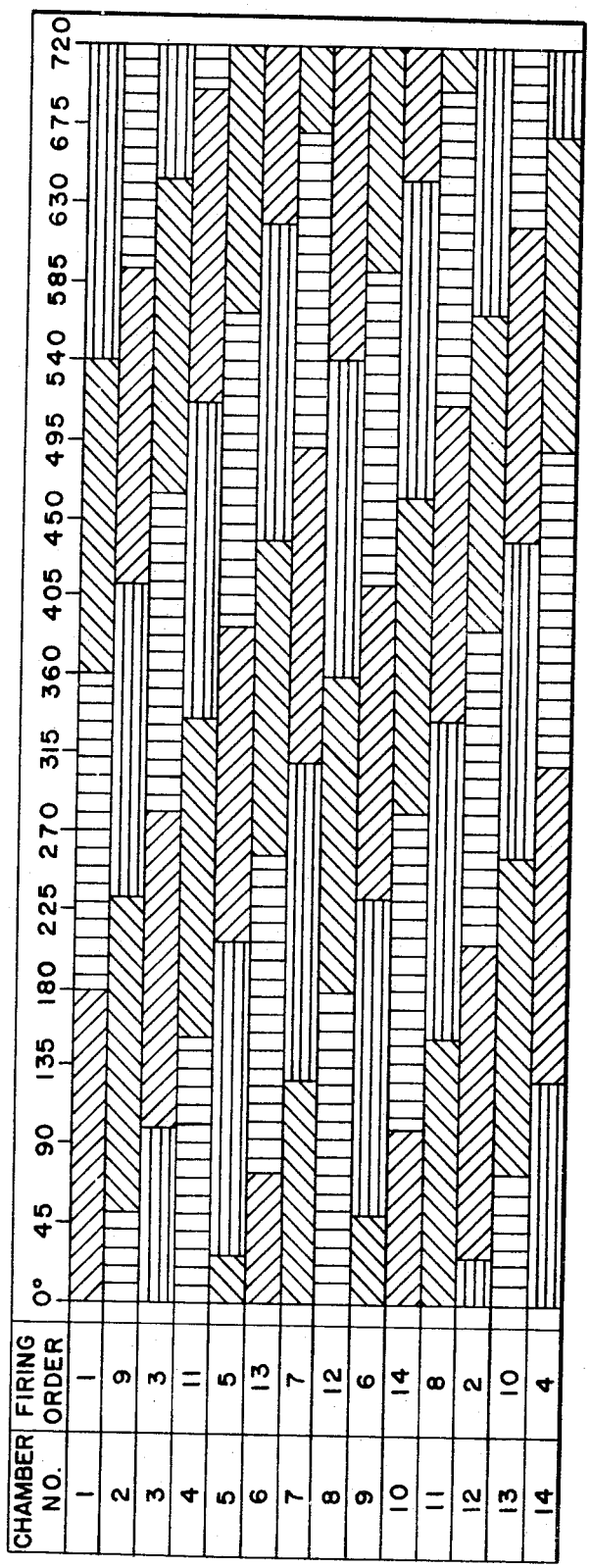
FIG. 12 is an illustrative table illustrating the firing order and cycle sequence of the various chambers of the embodiment of the present invention illustrated in FIG. 1.

With more particular reference to FIG. 12, a sequential graph is shown which described the firing order of the various chambers and the intake, compression, combustion, and exhaust sequence for each.

The numbering of the chambers as referenced on FIG. 12 is as follows. It will be seen that there are seven combustion chambers to the right of the pressure plate segments and seven combustion chambers to the left of the pressure plate segments. Taking any one of the seven chambers to the right, the number of that chamber will be 1; the corresponding chamber opposite chamber 1, just to the left of the pressure plate, is numbered chamber 8. The next chamber, also on the right, next and adjacent chamber 1, is numbered 2. The left corresponding chamber is 9. Continuing to number the adjacent right-hand chambers in order and giving the numbers of the left-hand chambers corresponding thereto: Chamber 3-chamber 10, chamber 4-chamber 11, chamber 5-chamber 12, chamber 6-chamber 13, chamber 7-chamber 14.

It is noted that, considering the number and set of chambers or compartments only to one side of the pressure plate elements, the number of chambers for 4-cycle units should be odd. Referring to this odd number as N, the relative speed of rotation of the rotor elements and pressure plate elements as compared to the speed of rotation of the annular valve ring should bear the relationship that $N+1$ bears to N. Furthermore, the number of ports in the annular valve ring should be $N+1$ divided by 2. That is, for the embodiment of FIG. 1, having seven chambers, the annular valve ring rotates at seven-eighths of the speed of rotation of the rotor and pressure plate elements. The number of intake ports is four and the number of exhaust ports is four. It is obvious that the structure and operation of the other side of the embodiment of FIG. 1, that is, to the other side of the pressure plate segments, is the same as that of the side just described.

It will be apparent from the descriptions herein that the present invention may be easily modified for use as a 2-cycle engine, a pump, a compressor, or an expander. For example, with reference to the above description, for a 2-cycle engine the number of ports in the annular valve ring is doubled. It will also be advantageous, for engines, expanders, and the like, in certain size ranges, to combine the annular valve ring with the outer sphere and to rotate the combined structure at the speeds specified herein for the annular valve ring.

It will also be apparent that the embodiments of the present invention may be modified by those skilled in the art for diesel operation.

The internal combustion engine 120a, shown in FIGS. 13 through 17, comprises a housing 121 and a rotary assembly 122 within the housing and coupled with an output shaft 123. The housing 121 may be conveniently formed from two substantially identical but oppositely disposed halves 124 and 125 secured together by a plurality of bolt means 126.

The rotary assembly 122 comprises a pair of substantially identical but oppositely disposed semi-spherical rotor members 127 and 128 respectively fixed to or made integral with shafts 129 and 130. Outer ends of the shafts 129 and 130 are respectively rotatably supported by combined radial and thrust bearing units 131 and 132 mounted in opposite end walls 133 and 134 of the housing. It is to be noted that the arrangement is such that the axes of rotation of the shafts 129 and 130 and thus the semi-spherical rotor members 127 and 128 are inclined with respect to each other and intersect each other at a point 135 shown in FIG. 13. Furthermore, the rotor members 127 and 128 are positioned so that the opposing end faces 136 and 137 thereof diverge with respect to each other as shown in FIG. 13 from a point of close proximity. The end faces 136 and 137 have a frusto-conical configuration as shown in FIGS. 13 and 14 and are provided with central ball seats 138 and 139 for the purpose described below.

A ball member 140 is disposed within the ball seats 138 and 139 and provides a universal connection between the rotor members 127 and 128. Furthermore, the ball 140 is disposed with its center at the point 135 or, in other words, at the intersection of the axes of rotation of the rotor members, and the ball 140 defines an inner margin of an annular space between the opposing faces 136 and 137 of the rotor members.

Blade members 141 are fixed to and extend radially from the ball 140 as shown in FIGS. 13 and 15. The blade members 141 are fan-shaped as shown in FIG. 17 and extend into slots 142 in the rotor member 127 and similar slots 143 in the rotor member 128 for dividing the annular space between the opposing faces of the rotor members into a plurality of expandable compartments or chambers 144 through 150. While the construction may be modified so as to vary the number of compartments, it is believed that all modifications should have an odd number of compartments. In the particular embodiment shown, seven compartments are provided.

The rotary assembly 122 further comprises an annular member 151 preferably formed from detachably connected complementary half sections 152 and 153 and presenting an inner surface 154 in the form of a segment of a sphere for mating with the spherical surfaces of the rotor members 127 and 128. The annular member 151 is mounted within the housing for rotation about an axis which intersects the point 135 and is disposed in the same plane as the axes of rotation of the rotary members 127 and 128. Suitable bearing units 155 and 156 are mounted within the housing for rotatably supporting the annular member 151. As shown in FIGS. 13 and 15, the annular member 151 serves to enclose the annular space between the rotor members 127 and 128 and to cover radially outer ends of the compartments 144 through 150. Radially outer edges of the blade like divider members 141 sealingly engage the inner surface 154 of the annular member 151 for sealing adjacent compartments from each other. Furthermore, suitable pairs of seal elements 157, 158 and 159–160 are disposed in the slots 142 and 143 respectively adjacent the end faces 136 and 137 of the rotor members 127 and 128 sealingly engaging the blade members 141 and resisting leakage from the compartments into the slots. An annular guide ring 161 is fixed to the member 151 and projects into slots 162 in the blade members 141 for maintaining the blade members in proper alignment.

As shown in FIG. 13, annular rotary seal units 163 and 164 are provided between the rotary member 151 and the housing and, as shown in FIGS. 13 and 15, transverse seal units 165 and 166 are provided between diametrically opposite portions of the housing and the rotary member 151 for defining substantially semi-annular manifolds 167 and 168. The manifold 167 is connected with a port 169 which in turn is connected by an inlet conduit 170 with a carburetor 171 or other suitable source of air and fuel. The manifold 168 communicates with an exhaust port 172 which in turn may be connected with any suitable exhaust conduit system, not shown.

In order to admit air and fuel to the chambers 144–150 and subsequently to exhaust the chambers, spaced ports 173, 174, 175 and 176 are formed in the rotary member 151. The number of ports is correlated with the number of compartments in the engine and preferably is equal to one-half of the next even number above the odd number of the compartments. As shown in FIG. 15, the ports 173 through 176 are uniformly spaced and are arranged so that when certain of the compartments communicate with the intake manifold 167, other of the compartments communicate with the exhaust manifold 168 and still other of the compartments are sealed from both the intake and exhaust manifold. The rotary member 151 is driven in the manner described in detail below not only relative to the housing 121 but also relative to the rotor members 127 and 128 so that the ports 173 through 176 are successively brought into registration with each of the compartments.

Oppositely disposed but otherwise identical beveled gears 177 and 178 are fixed on the shafts 129 and 130 and mesh with complementary beveled gears 179 and 180 respectively fixed on the output shaft 123. Additional gears 181 and 182 are fixed on the shaft 123 and mesh with ring gears 183 and 184 secured to opposite ends of the rotary member 151. Thus the rotary members 127 and 128 are operatively connected with the rotary member 151 ror movement in predetermined timed relationship therewith. The speed differential between the rotor members 127 and 128 and the annular rotary member 151 is, of course, determined by the number of compartments in the particular structure, and in the embodiment shown which has seven compartments, the gears 177 through 184 are constructed and arranged so that the rotor member or casing 151 rotates at seven-eighths of the speed of the rotor members 127 and 128.

During operation of the engine, each of the compartments 144 through 150 undergoes functions of air fuel intake, compression, power, and exhaust during the completion of two full rotations of the rotor members 127 and 128. For example, starting with the compartment 144 in the position shown in FIGS. 13 and 15, it is seen that the peripheral edge of the compartment is sealed by the rotary member 151 and the volume of the compartment is substantially at a minimum since the compartment is at the area of substantially closest proximity of the opposing faces 136 and 137 of the rotor members. Assuming that the compartment 144 has previously been filled with a combustible mixture of air and fuel, the mixture is ignited either by compression ignition or spark ignition. It will be appreciated that the timing may be adjusted so that the ignition takes place when the compartment 144 is at or even slightly in advance of or past a top dead-center position.

Upon ignition of the combustible mixture in the chamber 144, the expanding and burning gases apply increasing pressure to all of the surfaces defining the chamber. While the chamber 144 is moving from about its top dead-center position to its bottom dead-center position during the power portion of its cycle, the chamber is continuously closed by the rotary member 151. As indicated above, the rotor members rotate faster than the member 151 and thus while the chamber 144 is moving from the top dead-center position to the bottom dead-center position it "catches up with" the port 173. Then as the chamber 144 moves from the bottom dead-center position toward the top dead-center position the burning gases are exhausted through the port 173 into the exhaust manifold 168. Of course, as the chamber 144 moves from the bottom dead-center toward the top dead-center position, it gradually decreases in volume and the exhaust gases are forced therefrom.

As the chamber 144 passes the top dead-center position immediately after the exhaust portion of its cycle, it is still in communication with the port 173 and thus communication is established with the intake manifold 167. A charge of the combustible mixture is then drawn into the chamber 144 during this portion of its cycle and when the chamber again approaches the bottom dead-center position, the relative movement between the chamber and the rotary member 151 is such that the chamber passes beyond the port 173 and again becomes closed by the member 151. Then as the chamber 144 advances from the bottom dead-center position toward the top dead-center position the combustible mixture is compressed preparatory to ignition when the chamber 144 again is located at about the top dead-center position. Of course, it is understood that all of the chambers successively function in the same manner as the chamber 144.

As indicated above, either compression ignition principles or spark ignition means may be used for igniting the combustible mixture in the chambers. In the event a spark ignition system is used, sparkplugs 186 are mounted in bores 187 formed in the rotary member 128 and respectively communicating with each of the compartments. Each of the sparkplugs is connected with a slide contact 188 cooperable with a fixed contact 189 mounted within the housing and connected by a wire 190 with a suitable distributor designed to deliver an electrical impulse to the contact 189 at the desired moment.

FIGS. 18 and 19 show yet another embodiment of the present invention adapted for use as a fluid pump or motor. The structure of this embodiment is substantially the same as that described above (FIGS. 13–17) as indicated by the application of identical reference numerals with the suffix *a* added to corresponding parts. In this embodiment the rotor members 127*a* and 128*a* and cooperable blade means are identical to those described above except, of course, that the aforementioned sparkplugs and openings therefor are omitted. This embodiment differs primarily in that the rotary member 151*a* is formed with ports 192 through 198 equal in number to and respectively registering with the compartments 144*a* through 150*a* and the member 151*a* is rotated at the same speed as the rotor members 127*a* and 128*a* so that each of the ports is continuously in communication with the same compartment. In other words, the gears 177*a* through 184*a* are modified slightly from the gears described above so that the rotary member 151*a* rotates in unison with the members 127*a* and 128*a*.

When the unit 120*a* is to be used as a pump, the shaft 123*a* becomes an input shaft and is connected with an electric motor 191 or other suitable prime motor and the inlet port 169*a* is connected with a suitable source of fluid to be pumped and the outlet port 172*a* is connected with a desired discharge system. When the motor 191 is energized and the rotor assembly of the unit is driven, the chambers 144*a* through 150*a* will successively draw in fluid while they move from the top dead-center position toward the bottom dead-center position and while their associated ports are connecting with the intake manifold 167*a* whereupon the fluid will be discharged into the manifold 168*a* while the compartment successively moves from the bottom dead-center position toward the top dead-center position. It is further to be noted that the unit will work equally well as a pump when rotated in opposite directions.

The unit 120*a* may also be operated as a hydraulic motor. This is accomplished by connecting the port 169*a* with a suitable source of hydraulic fluid under pressure and the port 172*a* with an exhaust system and by connecting the shaft 123*a* with any desired load to be driven. Again it is to be noted that the unit is reversible and that the port 172*a* could be connected with the pressure source while the port 169*a* could be connected with the exhaust system.

FIGS. 20 and 21 show another embodiment of the present invention adaptable for use as an internal combustion engine or a fluid pump and motor. This embodiment is similar to the structure described above by FIGS. 13 through 19 as indicated by the application of identical reference numerals with the suffix *b* added to corresponding elements.

One important difference between the unit 120*b* and the said previous embodiments is that the rotary members 127*b* and 128*b* are mounted for rotation about a common axis. The annular member 151*b* is mounted within the housing means 121*b* for rotation about an axis inclined with respect to the axis of the rotors 127*b* and 128*b*. As in the previous embodiments, the annular space between opposing faces of the rotor members 127*b* and 128*b* is divided into a plurality of compartments by blade members 141*b*. However, it is to be noted that these blade members are fixed in suitable slots formed in the opposing ends of the rotor members so that no seals are required between the blade members and the rotor members.

In order to provide the rotor means of the unit 120*b* with compartments which progressively increase in volume during one-half of each revolution and then progressively decrease in volume during the other half of each revolution, the rotor means is provided with a relatively narrow annular disc means or partition 300 disposed in the annular space between the opposing rotor members 127*b* and 128*b* and arranged for rotation about the axis of the annular member 151*b*. The common axis of rotation of the disc means 300 and the member 151*b* is disposed for intersecting the axis of the rotor members 127*b* and 128*b* and the center of the central ball element 140*b*.

The disc means 300 is made up from a plurality of segments having inner margins secured to the central ball element and outer margins slidably disposed and an annular groove 302 formed in the annular member 151*b*. The disc means is traversed by radially extending slots 304 which respectively receive the blade members 141*b*. Complementary radially extending seal elements 306 and 308 are mounted in suitable seats formed in opposing faces of the slots 304 for sealingly and slidably contacting the blade or vane members 141*b*.

With the disc means 300 and rotor members arranged in the manner described above, it is seen that each of the compartments between the divider members 141*b* is divided into two portions by the disc means 300. Thus there are two separate compartments between each adjacent pair of blade members 141*b*, and for the sake of convenience these compartments will be designated as right- and left-hand compartments 144*b*–R through 150*b*–R and 144*b*–L through 150*b*–L respectively as viewed in FIG. 20. In other words, the rotor means comprises a first annular series of compartments at the right-hand side of the central disc means 300 and a second series of annular compartments at the left-hand side of the disc means 300. As the result of the angular relationship between the central disc means and the rotor members, the right-hand series of compartments have a minimum volume at a top dead-center position as viewed in FIG. 20 and a maximum volume at a bottom dead-center position while the left-hand series of compartments have a minimum volume at the bottom dead-center position and a maximum volume at the top dead-center position. Furthermore, it will be apparent that the portions of the blade members defining the leading end of the right-hand compartments will have a greater exposed area than the portions defining trailing ends of the right-hand compartments while the compartments are moving from the top dead-center position to the bottom dead-center position and will have a smaller exposed area while moving from the bottom dead-center position toward the top dead-center position. Conversely, the exposed portions of the blade members defining the leading sides of the left-hand compartments will have a greater area than the exposed blade portions defining the trailing ends of the left-hand compartments while the left-hand compartments are moving from the bottom dead-center position toward the top dead-center position and a smaller exposed area while the left-hand compartments are moving from the top dead-center position toward the bottom dead-center position.

In the embodiments shown, the unit 120*b* is adapted to be used as an internal combustion engine relying on compression ignition, but a spark ignition system may be provided if desired. An annular space between the housing means 121*b* and the annular member 151*b* is divided into separate intake and exhaust manifolds for the right and left-hand series of compartment portions 144*b*–R through 150*b*–R and 144*b*–L through 150*b*–L respectively. More specifically, transverse seals 165*b* and 166*b* extend across the aforementioned annular space, and an annular rotary seal 310 is disposed between the housing means 121*b* and the rotary annular member 151*b*. The rotary seal 310 and the transverse seal 165*b* and 166*b* combine to divide the annular space surrounding the member 151*b* into an inlet manifold portion 312 and an exhaust manifold portion 314 cooperable with the righthand chamber portions, and an inlet manifold portion 316 and an exhaust manifold portion 318 cooperable with the left-hand chamber portions as indicated best in FIG. 21. An inlet opening 320 is formed in the housing means 121*b* in communication with the manifold portion 312, which opening is adapted to be connected with any desired carburetor or source of fuel and air. An exhaust opening 322 is provided in the housing 121b in communication with the exhaust manifold portion 314 as shown in FIGS. 20 and 21. Another inlet port 324 the position of which is shown by dot and dash lines in FIG. 20 is provided for communicating with the inlet manifold portion 316 and another exhaust port 326 located adjacent the port 320 and at the position shown in dot and dash lines in FIG. 20 for communicating with the exhaust manifold portion 318.

The shaft 129b of the rotor member 127b projects from the housing for use as the drive shaft of the engine. In addition simplified gearing is shown connecting the rotor members with the annular member 151b. However, the gearing is such that the same speed differential described above in connection with the first embodiment is obtained between the annular member 151b and the rotor members. In other words, the annular member 151b rotates slower than the rotor members so that the ports in the annular member successively register with the compartments between the rotor members.

In operation, the engine of FIGS. 20 and 21 functions in essentially the same manner as the engine of FIGS. 13 through 17. More specifically, each compartment goes through a cycle of intake, compression, firing or power, and exhaust during each two revolutions of the rotor members 127b and 128b and the cycle of these compartments is identical to the cycle of the compartments of the engine 120 and therefor need not be described in detail. However, it is to be noted tha the engine 120b actually has fourteen separate compartments or, in other words, twice as many compartments as the engine 120 and the right-hand compartments of the unit 120b undergo ignition and commence their cycle adjacent a top dead-center position while the left-hand compartment of the unit 120b undergoes ignition and commence their cycle adjacent a bottom dead-center position.

With reference to FIGS. 22–25, there is illustrated yet another preferred embodiment similar to the embodiment shown in FIGS. 1–12. In this preferred embodiment, the overall rotary engine assembly as illustrated in FIGS. 1–12 is changed substantially only as shown and described with respect to FIGS. 22–25, and the location and operation of the illustrated outer shell, rotor and rotor blades, inner balls, and pressure plate segments are exactly similar to and as illustrated in the preferred embodiment of FIGS. 1–12.

With reference to FIG. 22, there is shown in exploded partial perspective the various changed and modified parts of the presently disclosed preferred embodiment.

Pressure plate segment or piston 211 is attached to center ball segments 212 and 213 and is pivotally mounted in outer shell 214 by means of pivot pin 215. Pressure plate segment 211 is attached to center ball segments 212 and 213 by means of locating pin 216 and bolt 217. Pivot pin 215 is so mounted in pressure plate segment 211 by thread engagement and is pivotably mounted at pivot point 218 which becomes a journal or bearing surface for the head 219 of pivot pin 215. The threaded portion 220 is engaged in threaded hole 221 of pressure plate segment 211. Exhaust ports 222 are similar in function to exhaust ports 55 (see FIG. 2) except that they have been relocated in the pressure plate segment 211 as shown. It will also be noted that mating exhaust port 223 in outer shell 214 has been relocated as is appropriate to the relocated exhaust ports 222 in pressure plate segment 211. Intake port 224 as shown has not been relocated as such and is located and performs the same function as intake port 46 (see FIG. 2). It will also be noted that bolts 100 and their corresponding attachments as shown in FIG. 2 have been eliminated. It will also be noted that seal groove and seal locations 225, 226, 227, 228, and 229 have been added and seal grooves 103 as shown in FIG. 2 have been deleted.

With reference to FIGS. 23 and 22, and elements 212, 213, 216, and 217, these elements substantially replace elements 32, 33, 101, and 102, as shown in FIG. 2. In this preferred embodiment it is noted that there are seven pressure plate segments 211 and sufficient complete ball segments 212 and 213 to develop a complete sphere when assembled. In other words, each of the elements 211, 212, 213, 216, and 217 are duplicated seven times to form seven combination parts of pressure plate segment and center ball segment, and the seven center ball segments comprising the center ball segment halves 213 and 212 replace and perform the function as described below of the center ball halves 33 as illustrated in FIG. 2 and the center ball half 33 corresponding parts, bolts, pins, etc.

Figure 24:
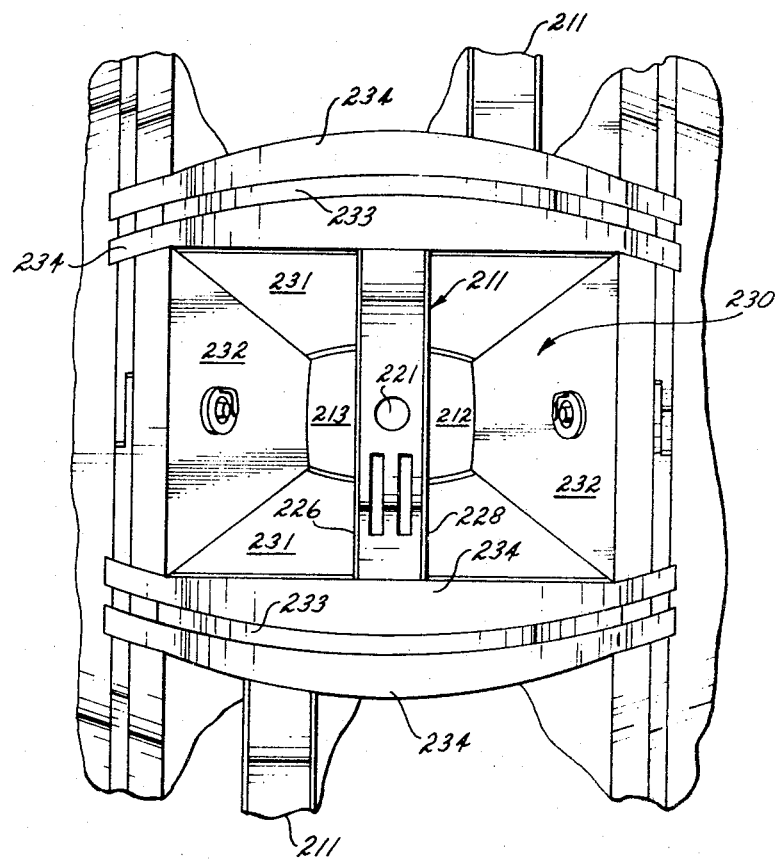
FIG. 24 is a partial view taken generally of the interior of one of the compartments of the preferred embodiment of this invention of FIG. 1 and shows that area of the engine shown by FIG. 6, except that the structure of FIG. 24 illustrates an improved and preferred embodiment.

FIG. 24 illustrates in schematic pictorial form the spacial relative relationship of two adjoining center segment combinations 212 and 213 and their corresponding pressure plates 211. Since the center segments 212 and 213 (there are seven of each such parts) are not attached to each other, but rather each center segment is attached only to its own pressure plate, the center segments 212 and 213 are free to move a slight amount with respect to each other, and as will be later seen in the discussion of the operation herein, that will necessarily be the case.

Figure 25:
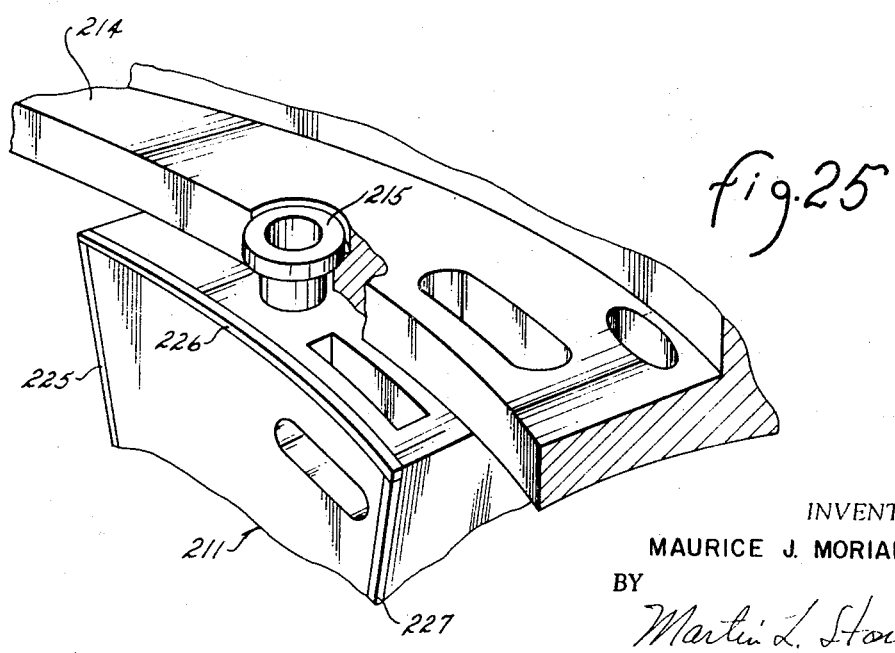
FIG. 25 is a perspective view of the relationship between the pressure plate segments and outer shell showing the preferred and improved embodiment illustrated particularly by FIGS. 22–24.

Referring now more specifically to FIG. 25, which is a similar view to FIG. 6, with the exception that FIG. 25 shows the perspective view of FIG. 6 to more clearly illustrate the present specific embodiment now described (other similar parts not mentioned herein being substantially similar to the parts of FIG. 6 and operation of the parts of FIG. 6), it is noted that the pressure plates 211 shown are movable within the illustrated chamber 230 in an obviously different manner than pressure plate 31 of FIG. 6 movable in its chamber, and the construction thereof differs.

With reference to FIG. 6 and the previous description of the method by which pressure plate segment 31 is movable, it will be noted upon observation of the arrangement of parts in FIG. 25 that certain changes have been made from the arrangement and construction of parts as shown in FIG. 6. In the first place, the walls 22 which have been described as being profiled walls and which are profiled and contoured in the manner and for the reason as discussed with respect to FIG. 6, it will be noted that the walls 231 as shown in FIG. 25, as for the similar walls 231 of all seven of the chambers 230, are planar walls. Since the construction of the sides of pressure plate segments 211 are also planar, the wiping action of pressure plate segment 211 as it moves back and forth in chamber 230 will be the wiping action of one planar surface upon a second planar surface, rather than the pivoted eccentric-type movement for the preferred embodiment of FIG. 6 and its associated figures.

Among the advantages of the presently described embodiment are the facts that (1) profiling is eliminated and (2) line point of contact seals 104 are eliminated for a more standard plane-on-plane wiping motion. Seals 227 and 229 as shown in FIG. 22 and the various other seals corresponding in location on the other seven pressure plates 211 are thus more or less standard bar-type seals. Obviously this movement capability in the presently described embodiment of pressure plate segments 211 is facilitated and made possible by the fact that pressure plate segments 211 may pivot on pins 215, which, as described before, are journal mounted in outer sphere 214, as illustrated more particularly in FIGS. 22 and 25.

It will be noted that the construction of the side walls 232 of chamber 230 are similar in structure, operation, and position to the side walls 108 as illustrated in FIG. 6 and as described for the said embodiment of FIG. 6. With special reference to FIG. 24, it is also noted that although the blades 233 are similar in structure arrangement and location to the corresponding blades illustrated in FIG. 6, the seal surfaces are made so as to produce the "flat"

surface 231 as heretofore described rather than as shown in FIG. 6, the seals 44 producing the profiled walls 22 as described in said FIG. 6.

It is further noted that in the prior described embodiment (that of FIG. 6), the seven pressure plate segments 31 were in effect "in line" with their longitudinal dimensions being substantially situated in the plane of rotation of the outer sphere. In the presently described embodiment, the seven pins 215 are located in said plane of rotation of said outer sphere (which as noted for the prior described embodiment, is preferably at an angle of approximately 20 degrees to the plane of rotation of the rotor); however, the pressure plate segments 211 are staggered one from the other in the manner illustrated as shown by the portions of the three adjacent pressure plate segments 211 illustrated in FIG. 24. It is noted that, as shown, the longitudinal dimensions of pressure plate segments 211 in the presently described embodiment are always situated perpendicular to the walls of the rotor blades.

With reference to FIG. 6, it will be noted that pressure plate segments 31 were attached by bolt means to the outer rotating shell. It will be noted that in the present embodiment, pressure plate segments 211 are attached to the outer rotating shell only by means of pivot pin 215 and, as such, it will be noted that it is now necessary to maintain the leakproof integrity of the outer periphery of the pressure plate segments and the mating inner surface of the outer rotating shell. As is shown in FIG. 6, this integrity is maintained by a contact surface, nonmovable, as for the previous described embodiment. For the present embodiment, the leakproof integrity of these surfaces is maintained by the application of seals 226 and 228 as shown in FIG. 22. It will be obvious that seal 109 as is shown in FIG. 6 and the previous embodiment is also advantageous in the present embodiment, except that its shape with respect to the surface which rubs against the perpendicular edge of pressure plate segment 211 will become a planar surface, while its inner surfaces will essentially perform the same sealing functions on the present center ball segments as were previously performed in the previously described embodiment.

With reference to FIGS. 26 and 27, there is illustrated yet another preferred embodiment similar to the embodiment shown in FIGS. 1 through 12 and 22 through 25. In this preferred embodiment, the overall rotary engine assembly as illustrated in FIGS. 1 et seq. is changed substantially only as shown in FIGS. 26 and 27. Excepting only as illustrated and discussed with respect to these two figures, the location and operation of the outer shell, rotor, blades, inner ball, and pressure plate segments are exactly similar to and as illustrated in the preferred embodiment illustrated by FIGS. 1–12 and 22–25.

With reference to FIG. 26, there is shown an exploded partial perspective showing the various changed and modified parts of the presently disclosed preferred embodiment.

Pressure plate and ball segment 250 is pivotally mounted in slideblock 252 by means of pivot pin 253. Slideblock plate 254 is attached and fixed by means of fastener 255 to the shell 251. Slideblock 252 is contained within slideblock plate 254 in such a way as to allow slight movement of slideblock 252 within slideblock plate 254 in the direction of rotation or opposite the direction of rotation of shell 251. Actual movement of slideblock 252 is limited to clearances necessary for the aforementioned movement. Pivot pin 253 is attached to pressure plate and ball segment 250 by means of a threaded shank or other suitable means. Exhaust ports 256 are similar in function to exhaust ports 55 (see FIG. 2), except they have been relocated in pressure plate and ball segment 250 as shown. It is noted that mating exhaust ports 257 have been relocated in shell 251 as would be appropriate to the relocated exhaust ports 256. and pressure plate and ball segment 250. Intake port 258, as shown, has not been relocated as such and is located and performs the same function as intake port 46 of FIG. 2. It is noted that bolts 100 and their corresponding attachments as shown in FIG. 2 have been eliminated. It is noted that seal groove and seal locations 259, 260, 261, 262, 263, 264, and 265 have been added and seal grooves 103 as shown in FIG. 2 have been deleted.

With reference to FIGS. 26 and 27, it is noted that elements 250 and 266 have substantially replaced elements 32, 33, 101, and 102 as shown in FIG. 2. In this preferred embodiment, it is noted that there are seven pressure plate and ball segments 250 and one ball segment guide 266. In other words, the element 250 is duplicated seven times to form seven pressure plate and ball segments which are fitted to the obvious guide slots in the single center ball guide 266. It is noted that the combination of seven pressure plate and ball segments 250 and one pressure plate ball segment guide 266 replaces and performs the function of the center ball halves 33 as illustrated in FIG. 2. With exceptions as noted, the function and advantages of the present embodiment is to eliminate profiling of blade surfaces 22 (as shown in FIG. 7) as well as to eliminate line point of contact seals 104 as shown in FIG. 7. The seals as used with the present embodiment are a more standard plane-on-plane wiping motion type of seal.

It is noted that in the embodiment of FIG. 1 herein illustrated, in the combustion or expansion cycle, a portion of the rotating force was transmitted directly to the shell 23 and the balance of rotating effort was transmitted by means of blades 22 to rotor 21 to hub 19 and thence to shaft 16. It is noted that this split effort was joined by means of the gear train as shown in FIG. 1 to final output on shaft 16. The present preferred embodiment differs in that the rotating forces are transmitted directly to shaft 16 by means of pressure plate and ball segment 250 and pressure plate and ball segment guide 266 as shown on FIGS. 26 and 27. It is also noted that pressure plate and ball segment guide 266 is attached to hub 19 by means of fasteners 267 as shown in FIGS. 26 and 27. This preferred embodiment reduces the need for an elaborate gear system as shown in FIG. 1. The requirement of the gear train in this embodiment is merely to synchronize the rotation of shell 23 and shaft 16.

It should be understood that many additional modifications, features, advantages, and commercial adaptations of the present invention will be evident to those skilled in the art without departing from the spirit and scope of this invention, limited only by a fair interpretation of the following claims:

Having fully described and disclosed the invention in such clear and precise terms as to enable those skilled in the art to understand and practice the same, I claim:

1. In a unit of the type described, rotor means providing an endless series of rotatable compartments, each said compartment being adapted to change in volume cyclically from a minimum volume to a maximum volume to a minimum volume with rotation of said compartments; rotatable porting means adjacent said rotor means and adapted to cyclically port each said compartment; and timing means constructed and arranged so that said rotor means is rotatable at a speed of rotation different from the speed of rotation of said porting means; said rotor means and said rotatable porting means being rotatable about separate axes inclined with respect to each other.

2. A unit as defined in claim 1 wherein said endless series of compartments is movable around a circular path of travel.

3. A unit as defined in claim 2 wherein said rotatable porting means annularly encircles said endless series of compartments.

4. A unit as defined in claim 1 wherein the separate axes are inclined with respect to each other approximately twenty degrees.

5. A unit as defined in claim 1 wherein the number of said compartments is odd, said rotor means providing N compartments, and said timing means providing a ratio between the rotational speeds of said rotor means and said porting means of $N+1/N$.

6. A unit as defined in claim 1 wherein said rotor means and said porting means are so constructed and arranged to provide, when rotated, pumping means, external to said compartments, operationally adapted for pumping intake fluids to said compartments.

7. A unit as defined in claim 1 wherein said rotor means and said porting means are so constructed and arranged to provide, when rotated, pumping means, external to said compartments, operationally adapted for pumping exhaust fluids from said compartments.

8. In a unit of the type described, a spherical casing element; a shaft element; rotor means providing a set of rotatable compartments therebetween; a set of double-acting piston elements, one in each said compartment, said set of piston elements being rotatable in a plane inclined to the plane of rotation of said compartments; and connection means between said spherical casing element and at least one said piston element, said connection means being constructed and arranged to allow relative motion between said spherical casing element and said piston element only in the plane of rotation of said piston element and radial turning of said piston element with respect to said spherical casing element about an axis passing through the center of said spherical casing element.

9. A unit as defined in claim 8 wherein said connection means includes a pin member attached to said piston element.

10. A unit as defined in claim 9 wherein said connection means includes a slideblock adapted to receive said pin member.

11. A unit as defined in claim 8 wherein said spherical casing element is rotatable.

12. A unit as defined in claim 11 wherein said spherical casing element is rotatable at the same speed of rotation as the speed of rotation of said set of piston elements.

13. A unit as defined in claim 8 wherein said shaft element is rotatable.

14. A unit as defined in claim 13 including second connection means between said piston element and said shaft element, said second connection means being so constructed and arranged to prevent relative movement between said piston element and said shaft element in the direction of rotation of said shaft element and to allow relative movement therebetween in a direction perpendicular to said direction of rotation.

15. A unit as defined in claim 14 wherein said second connection means includes at least one longitudinal slot in the periphery of said shaft element.

16. A unit as defined in claim 15 wherein said piston element includes a structure so constructed and arranged as to mate with said longitudinal slot.

17. In a unit of the type described, rotor means providing an endless series of rotatable compartments, each said compartment being adapted to change in volume cyclically from a minimum volume to a maximum volume to a minimum volume with rotation of said compartments; rotatable porting means adjacent said rotor means and adapted to cyclically port each said compartment; and timing means constructed and arranged so that said rotor means is rotatable at a speed of rotation different from the speed of rotation of said porting means; wherein said rotor means includes a first set of rotatable ports and said rotatable porting means includes a second set of rotatable ports; said rotor means, said rotatable porting means, and said timing means being so constructed and arranged that at least one port from said first set of ports is adjacent at least one port from said second set of ports continuously for at least approximately one-quarter of one revolution.

18. In a unit of the type described, rotor means providing an endless series of rotatable compartments, each said compartment being adapted to change in volume cyclically from a minimum volume to a maximum volume to a minimum volume with rotation of said compartments; rotatable porting means adjacent said rotor means and adapted to cyclically port each said compartment; and timing means constructed and arranged so that said rotor means is rotatable at a speed of rotation different from the speed of rotation of said porting means; wherein said rotor means is constructed and arranged as to be directly water cooled.

19. In a unit of the type described, rotor means providing an endless series of rotatable compartments, each said compartment being adapted to change in volume cyclically from a rotation of said compartments; a rotatable casing element peripherally enclosing said compartments, said rotatable casing element containing a set of ports communicating with said compartments; a rotatable valve element peripherally of said casing element, said valve element containing at least one port; including first timing means constructed and arranged so that said casing element is rotatable at the same speed of rotation as the speed of rotation of said compartments; and including second timing means constructed and arranged so that said valve element tis rotatable at a speed of rotation different from the speed of rotation of said compartments, in such manner as to provide a constant ratio between the speed of rotation of said valve element and the speed of rotation of said compartments.

20. In a unit of the type described, rotor means providing an endless series of rotatable compartments, each said compartment being adapted to change in volume cyclically from a minimum volume to a maximum volume to a minimum volume with rotation of said compartments; a rotatable casing element peripherally enclosing said compartments, said rotatable casing element containing a set of ports communicating with said compartments; a rotatable valve element peripherally of said casing element, said valve element containing at least one port; and including timing means constructed and arranged so that said valve element is rotatable at a speed of rotation different from the speed of rotation of said compartments, in such manner to to provide a constant ratio between the speed of rotation of said valve element and the speed of rotation of said compartments.

21. In a unit of the type described, rotor means providing an endless series of rotatable compartments, each said compartment being adapted to change in volume cyclically from a minimum volume to a maximum volume to a minimum volume with rotation of said compartments; a rotatable casing element peripherally enclosing said compartments, said rotatable casing element containing a set of ports communicating with said compartments; a rotatable valve element peripherally of said casing element, said valve element containing at least one port; including timing means constructed and arranged so that said valve element is rotatable at a speed of rotation different from the speed of rotation of said compartments; wherein there are N compartments and said timing means provides a ratio between the speeds of rotation of said compartments and said valve element of $N+1/N$.

22. In a unit of the type described, rotor means providing an endless series of rotatable compartments, each said compartment being adapted to change in volume cyclically from a minimum volume to a maximum volume to a minimum volume with rotation of said compartments; a rotatable casing element peripherally enclosing said compartments, said rotatable casing element containing a set of ports communicating with said compartments; a rotatable valve element peripherally of said casing element, said valve element containing at least one port; wherein said rotor means and said valve element are rotatable about separate axes inclined with respect to each other.

23. A unit as defined in claim 22 wherein said separate axes are inclined with respect to each other at an angle of approximately twenty degrees.

(References on following page)

References Cited

UNITED STATES PATENTS

| | | | |
|---|---|---|---|
| 2,965,288 | 12/1960 | Butler | 230—140X |
| 2,988,065 | 6/1961 | Wankel et al. | 123—8 |
| 3,277,792 | 10/1966 | Stenerson | 91—85 |
| 2,482,325 | 9/1949 | Davis | 230—142 |
| 3,176,667 | 4/1965 | Hammer | 123—43 |
| 3,139,871 | 7/1964 | Larpent | 123—43 |

FOREIGN PATENTS

| | | | |
|---|---|---|---|
| 333,256 | 12/1935 | Italy | 103—117 |
| 553,444 | 5/1943 | Great Britain | 91—69 |

WILLIAM E. WAYNER, Primary Examiner

U.S. Cl. X.R.

418—94, 162, 193